United States Patent
Luken et al.

(10) Patent No.: US 6,791,598 B1
(45) Date of Patent: Sep. 14, 2004

(54) METHODS AND APPARATUS FOR INFORMATION CAPTURE AND STEROSCOPIC DISPLAY OF PANORAMIC IMAGES

(75) Inventors: William Louis Luken, Yorktown Heights, NY (US); Zon-Yin Shae, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/528,260

(22) Filed: Mar. 17, 2000

(51) Int. Cl.[7] .......................... H04N 7/00; H04N 15/00
(52) U.S. Cl. ....................................................... 348/36
(58) Field of Search ............................. 348/36, 37, 38, 348/39, 42, 46, 47, 44; 396/20, 322, 325; H04N 7/00, 15/00

(56) References Cited

U.S. PATENT DOCUMENTS

| | | | |
|---|---|---|---|
| 3,850,505 A | | 11/1974 | Ratliff, Jr. |
| 4,221,462 A | | 9/1980 | Huvers |
| 4,241,985 A | | 12/1980 | Globus et al. |
| 4,429,328 A | * | 1/1984 | Jones et al. .................... 348/47 |
| 4,528,587 A | * | 7/1985 | Jones, Jr. ....................... 348/44 |
| D312,263 S | | 11/1990 | Charles |
| 5,396,583 A | | 3/1995 | Chen et al. |
| 6,023,588 A | * | 2/2000 | Ray et al. ...................... 396/20 |

* cited by examiner

*Primary Examiner*—Nhon Diep
(74) *Attorney, Agent, or Firm*—Douglas W. Cameron; Ryan, Mason & Lewis, LLP

(57) ABSTRACT

Methods and apparatus are provided to capture a real three dimensional scene, including both color and depth information, and subsequently use the resulting color and depth information to produce separate images for a viewer's left and right eyes, thereby producing a stereoscopic view of the original scene.

63 Claims, 13 Drawing Sheets

*FIG. 7B*

| A | B | C | D | E | F | G | H | I | J | K | L | M | L(j) |
|---|---|---|---|---|---|---|---|---|---|---|---|---|---|
| 0 | 0 | 0 | 2 | 2 | 2 | 3 | 3 | 3 | 4 | 4 | 0 | 0 | a * d(j) |
| A | B | | | | | | | | | | | | R(j=1) |
| A | B | C | | | | | | | | | | | R(j=2) |
| A | B | C | D | | | | | | | | | | R(j=3) |
| A | D | E | E | E | | | | | | | | | R(j=4) |
| A | D | E | F | F | F | | | | | | | | R(j=5) |
| A | D | E | F | G | G | G | | | | | | | R(j=6) |
| A | D | E | G | H | H | H | H | | | | | | R(j=7) |
| A | D | E | G | H | I | I | I | I | | | | | R(j=8) |
| A | D | E | G | H | I | J | J | J | J | | | | R(j=9) |
| A | D | E | G | H | J | K | K | K | K | K | | | R(j=10) |
| A | D | E | G | H | J | K | L | L | L | L | L | | R(j=11) |
| A | D | E | G | H | J | K | L | L | L | L | L | M | R(j=12) |

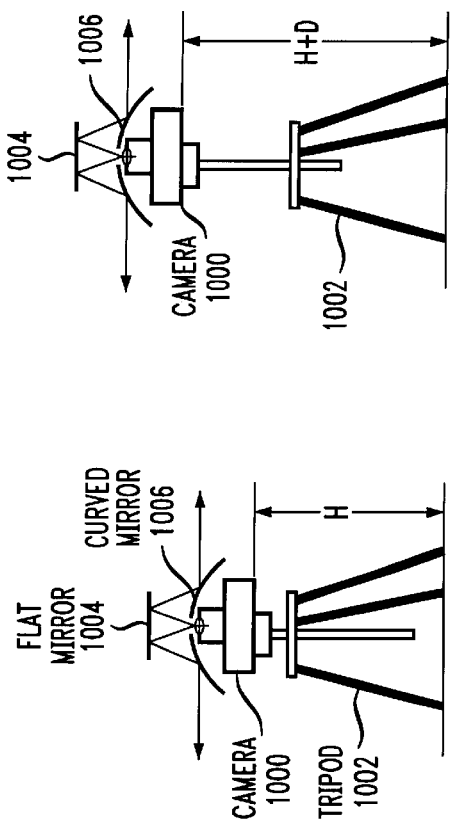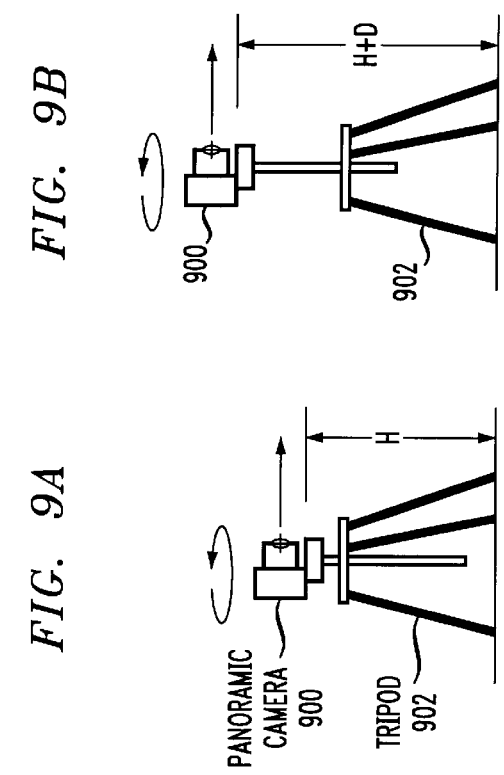

METHODS AND APPARATUS FOR INFORMATION CAPTURE AND STEROSCOPIC DISPLAY OF PANORAMIC IMAGES

FIELD OF THE INVENTION

The present invention is related to methods and apparatus for capturing and displaying images and, more particularly, to methods and apparatus for capturing and displaying stereoscopic representations of panoramic images.

BACKGROUND OF THE INVENTION

Ordinary rectilinear photographs provide faithful reproductions of real-life three-dimensional (3D) scenes. The resulting rectilinear images, however, appear very flat because much of the depth information, that is, the distances from the camera to the elements of the scene, is lost in the process of capturing and printing these images. Consequently, one simply "looks at" ordinary photographs and there is little sense of being immersed in the scene represented in the photographic image.

Two well-known techniques can be used to enhance the sense of immersion in a photographic or computer generated scene. One of these techniques is stereoscopic imaging in which differing rectilinear images are presented to a viewer's left and right eyes. The differences between these images can be detected by the human visual senses to provide a perception of the relative distances to various elements within a scene. The other technique is panoramic imaging in which a complete 360 degree representation of a scene is captured. Computer software can be used to project an interactively selected portion of such a panoramic image into a rectilinear image, thereby enabling a person to "look around" the scene. The ability to select any view direction interactively over a full 360 degree range provides an alternative sense of immersion. Since stereoscopic images and panoramic images both provide means of allowing a person to experience a sense of immersion in a scene, it would be useful to enhance this sensation further by combining both techniques to allow a person to see stereoscopic views of a panoramic scene.

Numerous devices have been developed for stereoscopic viewing of rectilinear images, including, for example, U.S. Pat. No. 3,850,505 entitled "Universal Stereoscopic Viewing Device," and U.S. Pat. No. 4,221,462 entitled "Stereoscopic Viewer for Panoramic Camera Film," the disclosures of which are incorporated by reference herein. Typically, such devices are based on capturing two rectilinear images of a scene, one of which is presented to a viewer's right eye, and the second of which is presented to the viewer's left eye. It should be noted that this process is divided into two distinct steps. In the first step, the scene is captured. In the second step, the captured scene is presented to the viewer. These two steps may take place simultaneously, as with the use of video cameras and video display devices. Alternatively, a persistent medium such as video tape, photographic film, or digital data may be used to capture the scene, allowing the scene to be viewed at a later time.

The scene capture step, as represented in FIG. 1, typically involves two cameras separated by some distance (D) perpendicular to the view direction (V). The distance D is defined by the difference between the location of the nodal point 10 of the lens on the right camera (R) and the location of the nodal point 12 of the left camera (L). The point M in FIG. 1 is the midpoint of the line joining these nodal points. The scene view direction (V) is determined by a vector perpendicular to the line joining the nodal points. The camera view directions (Vleft and Vright) of the left and right cameras are defined by vectors which are perpendicular to the film plane of each camera and which pass through the nodal point of the lens of the corresponding camera. The camera view directions may be parallel to the scene view direction, as shown in FIG. 1, or they may be converged to meet and cross in the area of the scene.

In an alternative means of capturing stereoscopic images, a single camera is used. In this case, the camera is placed in the first (left or right) position and a first image is captured. The camera is then moved to the second position where it is used to capture the second image. Otherwise, this method is equivalent to the use of two cameras.

It is also possible to use rectilinear images to capture a panoramic representation of a scene. Such a technique is illustrated in FIG. 2. This image capture technique may be accomplished by using a single camera to capture a first image (I1) with view direction V1 and field of view, $\theta_{fov}$. The field of view angle is determined by the focal length of the lens and the width of the image captured by the camera. The camera may then be rotated by an angle $\theta_{rot}$ about an axis passing through the nodal point of the lens to obtain a new view direction V2, and a second image (I2) may be captured with the camera in the new view direction V2.

If the rotation angle, $\theta_{rot}$, is less than the field of view angle, $\theta_{fov}$, then a portion of the left side of image I2 will overlap a portion of the right side of image I1. If image I2 results from rotating the camera about the nodal point of the lens, then the overlapping portions of images I1 and I2 will contain redundant information. In this case, these two images may be projected onto a common surface, such as a cylinder centered on the axis of rotation. The resulting pair of projected images may be merged into a seamless composite image (I12) representing a total field of view of $(\theta_{fov} + \theta_{rot})$. This process may be repeated until the resulting field of view encompasses 360 degrees, forming a complete and seamless panoramic image of the scene.

If the camera is rotated about any point other than the nodal point of the lens, then the overlapping portions of images I1 and I2 will not contain equivalent representations of the scene. For example, occlusion relations will change, making it possible to see elements of the scene in image I2 that are not visible in image I1. If these images are projected onto a common surface, the overlapping portions of the resulting projected images I1' and I2' will not match and it will not be possible to combine these images into a seamless composite. In this case, it is not possible to produce a seamless panoramic image of the scene.

Consequently, it can be seen that, in order to combine two or more rectilinear images into a seamless panoramic image, the camera must be rotated about the nodal point of the lens, and the camera must not be rotated about an axis which does not pass through the nodal point of the lens.

It is also possible to capture a seamless panoramic image by using a rotating panoramic camera such as that described in U.S. Pat. No. 4,241,985, the disclosure of which is incorporated by reference herein. As with the capture of rectilinear images, this device depends on the ability to rotate about the nodal point of a lens, and the resulting panoramic image corresponds to a projection of the scene onto the surface of a cylinder having a central axis passing through the nodal point of a lens.

Returning to the capture of stereoscopic images, it is possible to attempt to capture a stereoscopic panorama by rotating a pair of cameras about the midpoint (M) between the nodal points, as shown in FIG. 3. As illustrated, the pair of cameras, L and R, capture images at first positions A, are rotated about the midpoint M, and then capture images at second positions B. In this case, the point M does not coincide with the nodal point of either lens. Consequently, the resulting rectilinear images cannot be combined to form a seamless panoramic image. An example of this procedure has been attempted by Charles Wiltgen (http://www.quicktimefaq.org/). The results of the effort are presented at http://www.quicktimefaq.org/qtvr/archive/Goodies/3DofIice/StereoPano.html, where one can easily see that large image alignment errors are present at the seams between the constituent images.

As an alternative to rotating about the midpoint M, the vector joining the nodal points can be rotated about some other point, such as the nodal point of the left camera lens, as shown in FIG. 4, or the right camera lens. As illustrated in FIG. 4, the pair of cameras, L and R, capture images at first positions A, are rotated about the nodal point of the left camera, and then capture images at second positions B. This could allow the creation of a left-camera panorama, or a right-camera panorama, but not both, since this vector cannot rotate about both nodal points simultaneously, while keeping both nodal points fixed in space. For example, the camera rotation indicated in FIG. 4 can be used to produce a seamless panoramic image for the left camera, but the images captured by the right camera cannot be combined because this camera is not being rotated about its own nodal point.

As another alternative, the internodal vector V can be kept fixed while rotating both cameras about their respective nodal points, as illustrated in FIG. 5. As illustrated, the pair of cameras, L and R, capture images at first positions A, are each rotated about their respective nodal points, and then capture images at second positions B. In this case, the view directions do not remain perpendicular to the internodal axis. This results in a progressive loss of stereoscopic separation, defined as the projection of the internodal axis on a line perpendicular to the view direction, or $D'=D \cos \theta_{rot}$. After rotating both cameras by 90 degrees, the resulting view vectors will be co-axial, resulting in complete loss of stereoscopic separation ($D'=0$). Rotation by 180 degrees would result in the left camera (L) capturing an image appropriate for the right eye, and the right camera (R) capturing the image appropriate to the left eye ($D'=-D$). Consequently, it can be seen that the camera orientation requirements for capture of stereoscopic images conflict with the camera orientation requirements for panoramic image creation.

As yet another alternative means of creating a stereoscopic panorama, one could employ two rotating panoramic cameras with rotation axes separated by the same internodal distance used for conventional stereoscopic photography. The result, however, would be equivalent to the situation for rectilinear cameras presented in FIG. 5. That is, as the view angle increases from zero to 90 degrees, the stereoscopic separation drops from the initial value to zero, leading to a loss of stereopsis. Stereopsis is defined as the ability of a viewer to discern the distance to elements of a scene based on the differences between the images seen by the left and right eyes. Rotation by 180 degrees leads to negative stereoscopic separation (left/right reversal, $D'=-D$), and rotation by 270 degrees returns to null stereoscopic separation.

The foregoing considerations demonstrate that the conventional means of capturing stereoscopic images conflict with the conventional means of generating panoramic images. Since stereoscopic images possess valuable properties and panoramic images possess additional valuable properties, it is desirable to obtain both sets of properties simultaneously in the form of stereoscopic panoramic images. This invention, as described below, presents a practical means of achieving this objective.

Before describing this invention, two additional possible means of creating stereoscopic panoramic images are considered. These methods are presented in a set of web pages starting with http://www.geocities.com/ResearchTriangle/Thinktank/9588/. These pages were posted by a person identified only as "Eekman" who claimed to have done the work under the supervision of Prof. Gale E. Spring of Melbourne, Australia. One of the two methods presented by Eekman is based on using a curved mirror to capture a complete 360 degree panorama in a single image. The mirror is then to be moved vertically before capturing a second image. This approach, by itself, is likely to be ineffective because the resulting pair of images represent a vertical displacement, while normal stereoscopic image viewing requires a horizontal displacement. This is a consequence of the horizontal separation between a viewer's eyes. No means are disclosed for deriving appropriate horizontal displacements from the captured vertical displacements.

The second method presented by Eekman is based on a rotating digital scanner with an arrangement of mirrors to provide left and right displacements. The digital scanner is analogous to the film based device described in U.S. Pat. No. 4,241,985, the disclosure of which is incorporated by reference herein. By capturing the images in narrow vertical strips, the problems of aligning overlapping portions of adjacent rectilinear images is avoided. However, one critical weakness to this approach is the need for unique specialized hardware, instead of being able to use conventional photographic or digital cameras to capture the scene.

SUMMARY OF THE INVENTION

As shown in the background description above, there is a need for methods and apparatus for obtaining stereoscopic representations of panoramic scenes. The present invention provides such methods and apparatus by using a data structure called a "depth map," as will be explained in detail below. Thus, in accordance with the invention, a scene is represented by a panoramic color image and a panoramic depth map, instead of by two color images, one for the left eye and one for the right eye. The color image and depth map used in this invention represent the panoramic color data and corresponding depth values for the nodal point of the lens of a camera rotating about this nodal point. The panoramic color image may be used directly to determine view-dependent color images for one eye in the conventional manner. The color image for the other eye is then estimated based on the panoramic color image and the associated depth map. Alternatively, the panoramic color image may be considered as representing a point midway between two eyes and view-dependent color images may be estimated for both eyes based on the panoramic color image and depth map.

The present invention also provides various camera arrangements using one or more cameras, as will be explained, for capturing image information that may be used to generate and display stereoscopic representations of panoramic images.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 7A and 7B are diagrams illustrating a method of generating a second panoramic color image from a first panoramic color image and a depth map according to one embodiment of the present invention;

FIGS. 9A and 9B are elevation views of an image capturing arrangement according to a second embodiment of the present invention;

FIGS. 10A and 10B are elevation views of an image capturing arrangement according to a third embodiment of the present invention;

DETAILED DESCRIPTION OF PREFERRED EMBODIMENTS

Figure 1:
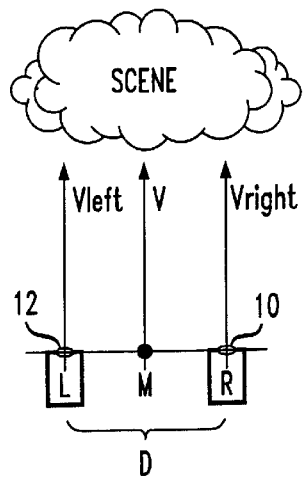
FIG. 1 is a diagram illustrating an image capturing arrangement according to a first conventional technique.
Figure 2:
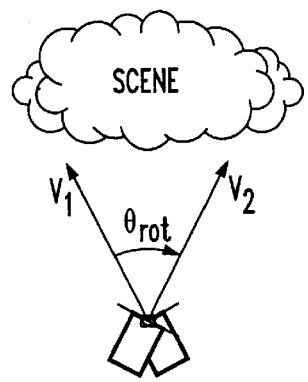
FIG. 2 is a diagram illustrating an image capturing arrangement according to a second conventional technique.
Figure 3:
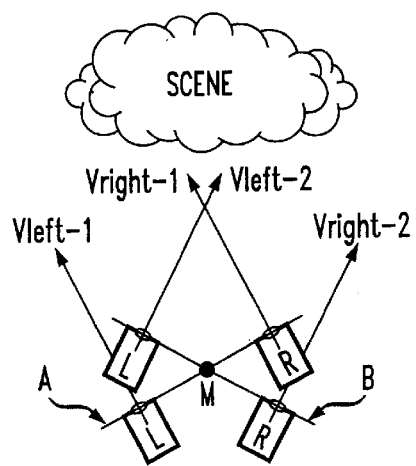
FIG. 3 is a diagram illustrating an image capturing arrangement according to a third conventional technique.

As mentioned above, the present invention provides methods and apparatus for obtaining stereoscopic representations of panoramic scenes by using a data structure called a depth map. Depth maps are well known in the field of three-dimensional (3D) computer graphics. In accordance with the invention, a depth map is associated with an image color data structure (or color image) which specifies the color for each member of a rectangular grid of picture elements (pixels). This grid is composed of a set of N rows and M columns. The pixel $P_{ij}$ specifies the color data for the point located at row i and column j in this grid. The image color for each pixel ($P_{ij}$) may be specified, for example, by a set of red, green, and blue intensity values.

The depth map associated with an image color data structure in this invention comprises an equivalent grid of pixels with N rows and M columns. The data value associated with row i and column j of the depth map may be indicated by $d_{ij}$. The value of $d_{ij}$ provides a measure of the distance from the nodal point of the lens to the nearest point in the scene in the direction represented by the corresponding color value ($P_{ij}$). The value of $d_{ij}$ actually represents the inverse of the distance (1/distance) from the nodal point to the corresponding point in the scene. A value of $d_{ij}=0$ represents an infinite distance, or no object, in the scene in the corresponding direction. Non-zero values of $d_{ij}$ are scaled so that the nearest point in the scene is assigned a value of $d_{max}$.

The value of $d_{max}$ depends on the amount of memory to be provided for each pixel in the depth map. The amount of memory provided for each pixel in the depth map may be, for example, 1, 2, 3, or 4 bytes. If the amount of memory provided for each pixel is n bytes, then the value of $d_{max}$ may be equal to or less than ($2^{8n}-1$). For example, if one byte of memory is provided for each pixel in the depth map (n=1), then $d_{max}=255$.

Thus, in accordance with the invention and as mentioned above, a scene is represented by a panoramic color image and a panoramic depth map. The color image and depth map used in this invention represent the panoramic color data and corresponding depth values for the nodal point of the lens of a camera rotating about this nodal point. The panoramic color image may be used directly to determine view-dependent color images for one eye in the conventional manner. The color image for the other eye is then estimated based on the panoramic color image and the associated depth map. Alternatively, the panoramic color image may be considered as representing a point midway between two eyes and view-dependent color images may be estimated for both eyes based on the panoramic color image and depth map.

The practicality of using a depth map instead of a second color image to support stereoscopic viewing of a panoramic scene depends on the resolution of two issues. The first is the issue of how to obtain the depth map. The second is the issue of creating an image for one eye based on a color image and depth map for the other eye or an intermediate point between a pair of eyes.

There are several ways to obtain a depth map. If the panoramic color image is based on computer generated images of 3D digital models, then a depth map may be obtained as a by-product of the 3D rendering process. A 3D digital model consists of a numerical description of the geometry of a scene, an object, or multiple objects. This description typically includes 3D coordinates (x, y, z) of points representing the objects. The points are connected to describe polygons such as triangles, and these polygons represent the surfaces of the scene or object(s) described by the 3D digital model, see, e.g., "Computer Graphics, Principles and Practice," Second edition, by J. D. Foley, A. van Dam, S. K. Feiner, and J. F. Hughes, Addison-Wesley, Reading, Mass., 1990, ISBN 0-2-1-12110-7.

The "3D rendering process" describes the means used to create a 2D digital image based on a 3D digital model. This process also typically depends on a virtual camera and simulated light sources (see Foley et al.). This process generally involves determining which pixels in the 2D digital image are associated with each polygon in the 3D digital model. The rendering process determines a color value (typically in RGB form, see Foley et al.) and a depth value for each pixel. The depth value represents the (inverse) distance from the virtual camera to a point on the surface of a polygon. This value is used to resolve the occlusion of overlapping polygons so that each pixel in the resulting 2D digital image represents the surface nearest to the virtual camera. The set of depth values determined through this process, one for each pixel in the 2D digital image, are collectively known as a "depth buffer" or "z-buffer."

Upon completion of the calculation of a 2D digital image, the depth buffer is usually discarded. Instead of being discarded, the set of data values contained within a depth buffer may also be saved as a data file referred to here as a "depth map." The resulting depth map is similar to a 2D digital image, except that each element of the depth map specifies an inverse depth value (distance from the virtual camera used to create the depth map) instead of a color value.

If the panoramic color image is based on photographs of a real world scene (a photographic scene), then a depth map must be created by other means. One method of creating a depth map for a photographic scene is to "paint" the depth map using standard image processing software such as Adobe PhotoShop. This method may be very laborious and imprecise. An alternative means of creating a depth map is to compare two images comprising a conventional stereoscopic pair of color images. Based on such a comparison, it is possible to calculate a depth map relating the two color images. Methods for deriving a depth map from a pair of color images are presented in "Three-Dimensional Computer Vision: A Geometric Viewpoint" by Olivier Faugeras, MIT Press, November 1993, ISBN 0-262-06158-9, the disclosure of which is incorporated by reference herein. Preferably, the depth maps to be used in this invention are produced by an algorithm such as that presented by Faugeras. That is, a stereoscopic pair of images of a scene is obtained using two cameras to capture the same scene from two nearby points. The distance between the two points represents the separation between the two eyes of a person observing the scene. Equivalently, instead of two cameras, the scene may be captured by a single specialized camera having two lenses, or a single camera may be used to capture the scene twice, once from each of two nearby points. The resulting pair of images are then compared to each other using the algorithms described by Faugeras to determine a depth map.

The particular means employed to produce a depth map are not part of this invention, and other means for producing a depth map may be used instead of the means described by Faugeras. This invention merely uses the resulting depth map to generate stereoscopic images and the means of this invention which are used to generate stereoscopic images do not depend on the means used to obtain or produce the depth map.

The second issue, that of forming a color image for a second eye based on a color image and depth map for a first eye, may be resolved by shifting the pixels in the first image by a horizontal displacement proportional to the corresponding depth map (inverse distance) value. That is, if $L_{ij}$ represents the pixel color for row i and column j of the left eye image, and $R_{ik}$ represents the pixel color for row i and column k of the right eye image, the color values for $R_{ik}$ may be determined as $R_{ik}=L_{ij}$, where $k=j-a*d_{ij}$. The value of $d_{ij}$ is the depth map entry (inverse distance) associated with the right eye color image, and "a" is a proportionality factor that can be chosen to control the strength of the stereoscopic effect (stereopsis).

The simple technique of shifting pixels horizontally by $a*d_{ij}$ columns is not sufficient to completely determine the new image for the second eye. Simply shifting pixels is defective in two respects. One defect is caused by image stretching and compression. The other defect is caused by occlusion changes.

The problem of image stretching and compression is found in rows of pixels where $d_{ij}$ is increasing or decreasing as a function of the column index j. In regions where $d_{ij}$ is increasing, the original pixels are compressed into fewer columns. This usually occurs on the left side of an object in the scene. In this case, some pixels are overwritten and lost. This is not a problem. In regions where $d_{ij}$ is decreasing, the original pixels become spread over a larger number of columns. This usually occurs on the right side of an object. This condition (stretching) can cause gaps between the original pixels.

The problem of gaps between pixels in regions where $d_{ij}$ is decreasing can be solved by smearing pixels instead of simply shifting them. That is, instead of simply copying pixel $L_{ij}$ to one pixel $R_{ik}$ with $k=j-a*d_{ij}$, the pixel Lij is copied to all pixels $R_{ik}$ with k=j to $j-a*d_{ij}$. If the value of the stereopsis factor "a" is positive, as are all elements $d_{ij}$ of the depth map, the values of $k=j-a*d_{ij}$ imply a shift to the left side of the image. In this case, it is essential to process the columns (j) from left to right (j=1 to M), discarding pixels where k<1. If a negative value for the factor "a" were to be employed, then the pixels would be shifted to the right. In this case, it would be necessary to process the columns from right to left (j=M to 1), discarding pixels with k>M. In the case of a 360 degree stereoscopic image, instead of discarding pixels with k<1 or k>M, said pixels should be "wrapped" by adding or subtracting the number of columns (M) to give k'=k+M or k'=k−M in the range of 1 to M.

The problem of occlusion changes results from the fact that the left eye may be able to see parts of the scene that were not visible in the image captured for the right eye. This condition occurs to the right of any object which is separated from the background. It is not possible to reconstruct the "correct" color values for the revealed pixels. Instead, the objective is merely to fill these areas with a plausible substitute for the correct colors. In the simplest case, the background may be filled with a solid color. In this case, the revealed pixels can be filled by modifying the pixel smearing technique to smear one pixel to the right of $L_{ij}$. That is, instead of smearing pixel $L_{ij}$, the pixel $L_{i(j+1)}$ is copied to pixels $R_{i(k+1)}$ for k=j to $j-a*d_{ij}$, followed by copying pixel $L_{ij}$ to pixel $R_{ik}$ for $k=j-a*d_{ij}$.

This technique for dealing with revealed pixels preserves the boundary between a foreground object and the background by smearing the background. The resulting background colors are not necessarily correct, unless the background happens to be filled with a solid color. The resulting errors are usually not very noticeable and do not interfere with the stereoscopic depth perception.

Instead of constructing a second color image, it is possible to save computer memory resources by calculating a "shift buffer" with the same number of rows and columns as are found in the color image, and where each element $S_{ij}$ records the column index (k) of the left eye pixel $L_{ik}$ corresponding to right eye pixel $R_{ij}$. That is, $S_{ij}=k$. In this way, given the left eye color image (L) and the shift buffer (S), each pixel of the right eye image may be determined rapidly as $R_{ij}=L_{ik}$ where $k=S_{ij}$.

It is to be appreciated that this is merely one example of a method of generating a stereoscopic pair of images from a single color image and a corresponding depth map according to the present invention. One skilled in the art may easily devise similar techniques, such as using the original color image and depth map as the right eye data and deriving a left eye color image. Another variation on this technique would be to treat the original color image and depth map as representing a central position midway between the eyes, and deriving new color images for both eyes in a symmetrical manner. Another approach would be to use a range-finding camera to determine a depth map directly instead of comparing a pair of color images.

Figure 7A:
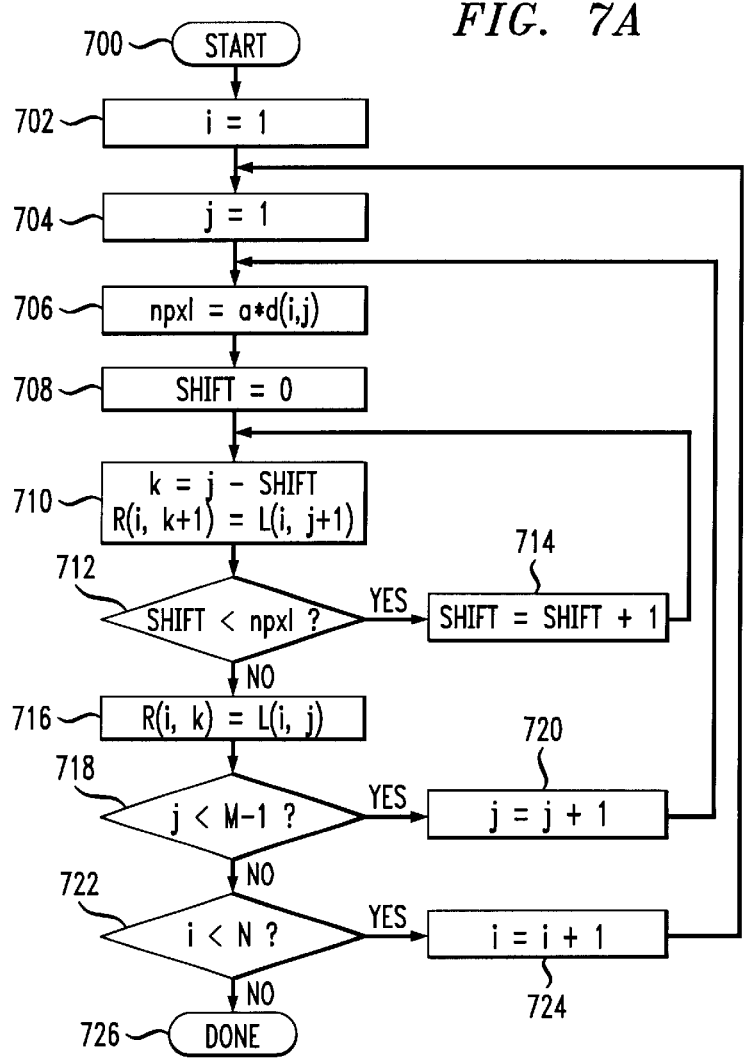

We now describe an exemplary method for generating stereoscopic image pairs based on a panoramic color image and an associated panoramic depth map in accordance with FIGS. 7A and 7B.

In the flow chart of FIG. 7A: L(i,j)=an element of the original (left) image (with N rows and M columns); d(i,j)=an element of the depth map (with N rows and M columns); and R(i,j)=an element of the new (right) image (with N rows and M columns), so that i takes the values of 1 to N and j takes the values of 1 to M. In addition, "a" represents the value of the stereopsis factor which is independent of i and j.

The operation of this invention is further illustrated in accordance with the diagram of FIG. 7B which comprises 14 rows of boxes and which is explained below. The row index "i" is suppressed in this diagram because the same structures are repeated for every row of the images L and R and the depth map d.

The first row of boxes in FIG. 7B represents the colors of 13 pixels in row "i" of the left image (L), where the first box, L(1), represents the color "A" of the first pixel L (i,1) in this row. The second box, L(2), represents the color "B" of the second pixel L (i,2) in this row, and so forth. In this case, the notation "L(j)" represents the contents of the 13 boxes in this row of the diagram, with j having values 1 to 13.

The second row of boxes in FIG. 7B represents the products of the stereopsis factor "a" and each of the depth map elements d(j)=d(i,j) associated with the corresponding elements L(j)=L(i,j) in the first row of this diagram. In this example, a* d(1) has the value "0," where d(1) represents d(i,1), the depth map value associated with the pixel L(i,1) in row i of image L; a*d(4) has the value "2," where d(4) represents d(i,4), the depth map value associated with the pixel L(i,4) in row i of image L; and so forth. As in the first row, the notation "a*d(j)" represents the contents of the 13 boxes in this row of the diagram, with j having values 1 to 13.

From the values in the second row of boxes, it can be seen that pixels 1, 2, 3, 12 and 13 in the selected row (with colors A, B, C, L and M) represent a distant background, since a depth map value of zero represents an infinite distance from the camera. Pixels 4 to 11 represent an oblique foreground surface which obscures the corresponding portion of the background.

The remaining rows of boxes represent the evolution of the corresponding pixels in the right image (R) as the algorithm advances from j=1 to j=12. For these twelve lines, the symbol "j" represents the value of "j" indicated in elements 704, 706, 710, 716, 718, and 720 of FIG. 7A.

The steps of the illustrative process will now be explained in detail with reference to the table in FIG. 7B and the steps of the flow chart of FIG. 7A in parentheses next to each substep. The row index "i" has been suppressed here, since exactly the same logic is repeated on every row. Items 702, 722, 724, and 726 have the effect of "repeat all of this for each row in the image L." The steps are as follows:

(Initialization): Set j=1 (704)

Step 1 (with j=1):
 Set npxl=a*d(1)=0 (706)
 Set shift=0 (708)
 Set k=1 (710)
 Copy color B from L(2) to R(2) (710)
 (712) Is (shift=0)<(npxl=0)? No, so go on to (716)
 Copy color A from L(1) to R(1) (716)
 (718) Is (j=1)<(M−1=12)? Yes, so go to (720)
 Increment j from 1 to 2 (720)

Step 2 (with j=2):
 Set npxl=a*d(2)=0 (706)
 Set shift=0 (708)
 Set k=2 (710)
 Copy color C from L(3) to R(3) (710)
 (712) Is (shift=0)<(npxl=0)? No, so go on to (716)
 Copy color B from L(2) to R(2) (716)
 (718) Is (j=2)<(M−1=12)? Yes, so go to (720)
 Increment j from 2 to 3 (720)

Step 3 (with j=3):
 Set npxl=a*d(3)=0 (706)
 Set shift=0 (708)
 Set k=3 (710)
 Copy color C from L(4) to R(4) (710)
 (712) Is (shift=0)<(npxl=0)? No, so go on to (716)
 Copy color B from L(3) to R(3) (716)
 (718) Is (j=3)<(M−1=12)? Yes, so go to (720)
 Increment j from 3 to 4 (720)

Step 4 (with j=4):
 Set npxl=a*d(4)=2 (706)
 Set shift=0 (708)
 Set k=4 (710)
 Copy color E from L(5) to R(5) (710)
 (712) Is (shift=0)<(npxl=2)? Yes, so go on to (714)
 Increment shift from 0 to 1 (714)
 Set k=3 (710)
 Copy color E from L(5) to R(4) (710)
 (712) Is (shift=1)<(npxl=2)? Yes, so go on to (714)
 Increment shift from 1 to 2 (714)
 Set k=2 (710)
 Copy color E from L(5) to R(3) (710)
 (712) Is (shift=2)<(npxl=2)? No, so go on to (716)
 Copy color D from L(4) to R(2) (716)
 (718) Is (j=4)<(M−1=12)? Yes, so go to (720)
 Increment j from 4 to 5 (720)

Step 5 (with j=5):
 Set npxl=a*d(5)=2 (706)
 Set shift=0 (708)
 Set k=5 (710)
 Copy color F from L(6) to R(6) (710)
 (712) Is (shift=0)<(npxl=2)? Yes, so go on to (714)
 Increment shift from 0 to 1 (714)
 Set k=4 (710)
 Copy color F from L(6) to R(5) (710)
 (712) Is (shift=1)<(npxl=2)? Yes, so go on to (714)
 Increment shift from 1 to 2 (714)
 Set k=3 (710)
 Copy color F from L(6) to R(4) (710)
 (712) Is (shift=2)<(npxl=2)? No, so go on to (716)
 Copy color E from L(5) to R(3) (716)
 (718) Is (j=4)<(M−1=12)? Yes, so go to (720)
 Increment j from 4 to 5 (720)

Step 6 (with j=6):
 Set npxl=a*d(6)=2 (706)
 Set shift=0 (708)
 Set k=6 (710)
 Copy color G from L(7) to R(7) (710)

(712) Is (shift=0)<(npxl=2)? Yes, so go on to (714)
Increment shift from 0 to 1 (714)
Set k=5 (710)
Copy color G from L(7) to R(6) (710)
(712) Is (shift=1)<(npxl=2)? Yes, so go on to (714)
Increment shift from 1 to 2 (714)
Set k=4 (710)
Copy color G from L(7) to R(5) (710)
(712) Is (shift=2)<(npxl=2)? No, so go on to (716)
Copy color F from L(6) to R(4) (716)
(718) Is (j=6)<(M−1=12)? Yes, so go to (720)
Increment j from 6 to 7 (720)
Step 7 (with j=7):
 Set npxl=a*d(7)=3 (706)
 Set shift=0 (708)
 Set k=7 (710)
 Copy color H from L(8) to R(8) (710)
 (712) Is (shift=0)<(npxl=3)? Yes, so go on to (714)
 Increment shift from 0 to 1 (714)
 Set k=6 (710)
 Copy color H from L(8) to R(7) (710)
 (712) Is (shift=1)<(npxl=3)? Yes, so go on to (714)
 Increment shift from 1 to 2 (714)
 Set k=5 (710)
 Copy color H from L(8) to R(6) (710)
 (712) Is (shift=2)<(npxl=3)? Yes, so go on to (714)
 Increment shift from 2 to 3 (714)
 Set k=4 (710)
 Copy color H from L(8) to R(5) (710)
 (712) Is (shift=3)<(npxl=3)? No, so go on to (716)
 Copy color G from L(7) to R(4) (716)
 (718) Is (j=7)<(M−1=12)? Yes, so go to (720)
 Increment j from 7 to 8 (720)
Step 8 (with j=8):
 Set npxl=a*d(8)=3 (706)
 Set shift=0 (708)
 Set k=8 (710)
 Copy color I from L(9) to R(9) (710)
 (712) Is (shift=0)<(npxl=3)? Yes, so go on to (714)
 Increment shift from 0 to 1 (714)
 Set k=7 (710)
 Copy color I from L(9) to R(8) (710)
 (712) Is (shift=1)<(npxl=3)? Yes, so go on to (714)
 Increment shift from 1 to 2 (714)
 Set k=6 (710)
 Copy color I from L(9) to R(7) (710)
 (712) Is (shift=2)<(npxl=3)? Yes, so go on to (714)
 Increment shift from 2 to 3 (714)
 Set k=5 (710)
 Copy color I from L(9) to R(6) (710)
 (712) Is (shift=3)<(npxl=3)? No, so go on to (716)
 Copy color H from L(8) to R(5) (716)
 (718) Is (j=8)<(M−1=12)? Yes, so go to (720)
 Increment j from 8 to 9 (720)
Step 9 (with j=9):
 Set npxl=a*d(9)=3 (706)
 Set shift=0 (708)
 Set k=9 (710)
 Copy color J from L(10) to R(10) (710)
 (712) Is (shift=0)<(npxl=3)? Yes, so go on to (714)
 Increment shift from 0 to 1 (714)
 Set k=8 (710)
 Copy color J from L(10) to R(9) (710)
 (712) Is (shift=1)<(npxl=3)? Yes, so go on to (714)
 Increment shift from 1 to 2 (714)
 Set k=7 (710)
 Copy color J from L(10) to R(8) (710)
 (712) Is (shift=2)<(npxl=3)? Yes, so go on to (714)
 Increment shift from 2 to 3 (714)
 Set k=6 (710)
 Copy color J from L(10) to R(7) (710)
 (712) Is (shift=3)<(npxl=3)? No, so go on to (716)
 Copy color H from L(9) to R(6) (716)
 (718) Is (j=9)<(M−1=12)? Yes, so go to (720)
 Increment j from 9 to 10 (720)
Step 10: (with j=10):
 Set npxl=a*d(10)=4 (706)
 Set shift=0 (708)
 Set k=10 (710)
 Copy color K from L(11) to R(11) (710)
 (712) Is (shift=0)<(npxl=4)? Yes, so go on to (714)
 Increment shift from 0 to 1 (714)
 Set k=9 (710)
 Copy color K from L(11) to R(10) (710)
 (712) Is (shift=1)<(npxl=4)? Yes, so go on to (714)
 Increment shift from 1 to 2 (714)
 Set k=8 (710)
 Copy color K from L(11) to R(9) (710)
 (712) Is (shift=2)<(npxl=4)? Yes, so go on to (714)
 Increment shift from 2 to 3 (714)
 Set k=7 (710)
 Copy color K from L(11) to R(8) (710)
 (712) Is (shift=3)<(npxl=4)? Yes, so go on to (714)
 Increment shift from 2 to 3 (714)
 Set k=6 (710)
 Copy color K from L(11) to R(7) (710)
 (712) Is (shift=4)<(npxl=4)? No, so go on to (716)
 Copy color J from L(10) to R(6) (716)
 (718) Is (j=10)<(M−1=12)? Yes, so go to (720)
 Increment j from 10 to 11 (720)
Step 11: (with j=11):
 Set npxl=a*d(11)=4 (706)
 Set shift=0 (708)
 Set k=11 (710)
 Copy color L from L(12) to R(12) (710)
 (712) Is (shift=0)<(npxl=4)? Yes, so go on to (714)
 Increment shift from 0 to 1 (714)
 Set k=10 (710)
 Copy color L from L(12) to R(11) (710)
 (712) Is (shift=1)<(npxl=4)? Yes, so go on to (714)
 Increment shift from 1 to 2 (714)
 Set k=9 (710)
 Copy color L from L(12) to R(10) (710)
 (712) Is (shift=2)<(npxl=4)? Yes, so go on to (714)

Increment shift from 2 to 3 (714)
Set k=8 (710)
Copy color L from L(12) to R(9) (710)
(712) Is (shift=3)<(npxl=4)? Yes, so go on to (714)
Increment shift from 2 to 3 (714)
Set k=7 (710)
Copy color K from L(12) to R(8) (710)
(712) Is (shift=4)<(npxl=4)? No, so go on to (716)
Copy color J from L(11) to R(7) (716)
(718) Is (j=11)<(M−1=12)? Yes, so go to (720)
Increment j from 11 to 12 (720)
Step 12: (with j=12):
Set npxl=a*d(12)=0 (706)
Set shift=0 (708)
Set k=12 (710)
Copy color M from L(13) to R(13) (710)
(712) Is (shift=0)<(npxl=0)? No, so go on to (716)
Copy color L from L(12) to R(12) (716)
(718) Is (j=12)<(M−1=12)? No, so go to (722)

Next, steps 722, 724, and 702 produce a loop over all rows in the image, repeating the preceding steps on each row in the image.

As a result of these steps, the portion of the background represented by pixels 2 and 3 in image L is obscured by the foreground object in image R. The foreground object has been compressed from 8 pixels in image L to 6 pixels (pixels 2 to 7) in image R. Pixels 8 to 11 in image R represent a portion of the background not visible in image L. Having no information about the true colors in this revealed background area, color L is used to fill the space from pixel 8 to pixel 12 of image R. Pixels 1 and 13 remain unchanged.

Figure 6A:
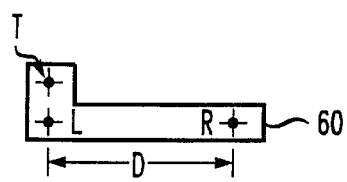
FIG. 6A is a top plan view of a mounting bar for use in an image capturing arrangement according to a first embodiment of the present invention.
Figure 6B:
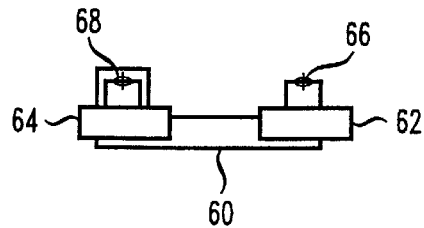
FIG. 6B is a top plan view of an image capturing arrangement using the mounting bar of FIG. 6A.

We now turn to a description of various camera arrangements for capturing image information that may be used to generate and display stereoscopic representations of panoramic images according to the invention. Referring to FIGS. 6A and 6B, apparatus is shown for use in capturing stereoscopic representations of panoramic images according to one preferred embodiment of this invention. As shown in FIG. 6B, two rectilinear cameras, 62 and 64, are mounted on a horizontal bar 60. The view in FIG. 6B and, as will be discussed below, FIG. 6A, is a top plan view of the apparatus. A "rectilinear camera" as used in accordance with the invention is defined as a camera with a planar image capture surface and a rectilinear lens.

In a simple form shown in FIG. 6A, the bar 60 has three holes labeled T, L, and R. The first hole (T) is threaded to accommodate a standard (¼"–20) tripod head mounting screw. The other two holes (L, R) are ¼ inch unthreaded holes which can accommodate standard (¼"–20) machine screws compatible with the blind mounting holes generally found on the bottoms of standard cameras. The separation (D) between holes L and R may be in the range of 6 to 12 inches. The separation between holes (T) and (L) is such that the nodal point 68 of the lens on the left camera 64 is located on the axis of rotation of a tripod when the body of the camera is mounted on hole (L). The right camera 62 has a nodal point 66. The resulting distance from hole (L) to hole (T) is approximately 2 to 3 inches depending on the size of the lens.

Figure 6C:
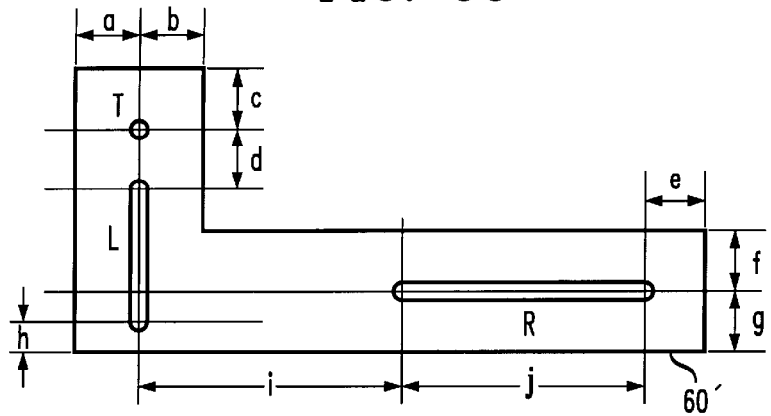
FIG. 6C is a top plan view of a mounting bar for use in an image capturing arrangement according to a second embodiment of the present invention.

In a preferred embodiment, hole (L) has the form of a slot perpendicular to the line from hole (L) to hole (R) and collinear with hole (T). One or more additional parallel slots may also be provided to accommodate cameras with off-center mounting holes. In addition, hole (R) has the form of a slot parallel to the long axis of the bar. In this case, slot (L) allows the position of the left camera 64 to be adjusted so as to ensure that the nodal point 68 of the lens of the left camera coincides with the rotational axis of the tripod attached to the bar at hole (T), and slot (R) allows the separation distance (D) to be adjusted. This embodiment of the bar is shown in FIG. 6C as bar 60'. In a preferred embodiment of bar 60', the first hole (T) is threaded to accommodate a standard (¼"–20) tripod head mounting screw. The other two holes (L, R) are slotted as shown with a width of ¼". Further, in such a preferred embodiment, the dimensions a through g may each be 1", the dimension h may be ½" and the dimensions i and j may each be 4". Of course, these are just exemplary dimensions and not intended to limit the invention.

The apparatus is operated by mounting the bar 60 shown in FIG. 6A on a standard tripod (not shown). The two cameras, 62 and 64, are mounted on the bar as shown in FIG. 6B, with the plane of this figure parallel to the horizon and perpendicular to the axis of rotation of the tripod. The cameras may be either film-based cameras, digital cameras, or any other suitable means of capturing images. With the mounting bar in an initial orientation with respect to the tripod axis of rotation, one image is captured with each camera. These images may be designated as color images $L_1$ and $R_1$. Preferably, both images are captured simultaneously.

Figure 4:
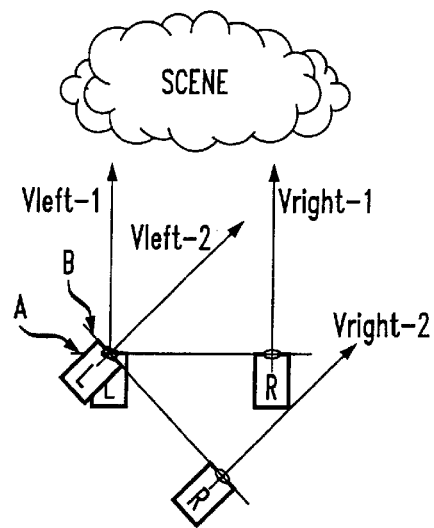
FIG. 4 is a diagram illustrating an image capturing arrangement according to a fourth conventional technique.
Figure 5:
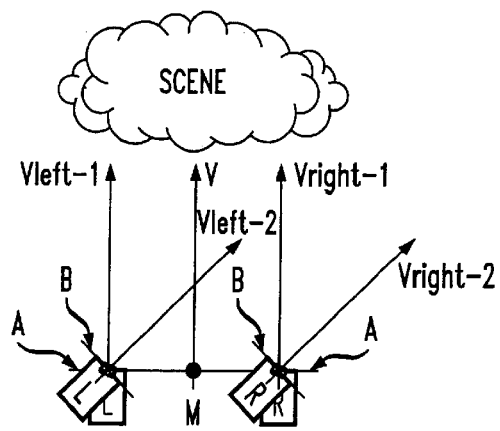
FIG. 5 is a diagram illustrating an image capturing arrangement according to a fifth conventional technique.

After capture of color images $L_1$ and $R_1$, the camera mounting bar is rotated by an angle about the tripod axis of rotation. This new orientation is related to the original orientation in the manner shown in FIG. 4. The size of the angle of rotation is chosen so that the horizontal field of view covered by the left camera 64 overlaps with the field of view captured in color image $L_1$. With the apparatus in this rotated orientation, a second image is captured with each camera, 62 and 64. These images are designated as color images $L_2$ and $R_2$. Preferably, color images $L_2$ and $R_2$ are captured simultaneously.

This process is repeated to capture additional pairs of color images $L_3$, $R_3$, $L_4$, $R_4$, etc. until the horizontal field of view of the left camera overlaps the field of view captured in color image L1. If the cameras are film-based, the film is processed and printed, and the resulting images are digitized. In any case, the result is a set of digital color images designated as $L_1$, $R_1$, $L_2$, $R_2$, etc. Each pair of digital color images ($L_i$, $R_i$) is then compared to determine a depth map ($D_i$). The right camera color images ($R_i$) are then discarded, leaving a set of left camera color images ($L_i$) and corresponding depth maps ($D_i$). The left camera color images ($L_i$) are then projected onto a cylindrical surface centered on the axis of rotation. The resulting cylindrically projected color images ($L_i'$) are then merged into a seamless panoramic color image ($L_{pan}$).

The panoramic color image $L_{pan}$ is a rectangular grid of pixels determined by merging the overlapping projected color images ($L_i'$). The number of rows and columns in this image depends on the number of rows and columns in each of the constituent images ($L_i'$) and their degree of overlap. Means of merging multiple overlapping color images to form a seamless panoramic image are well-known and embodied in a variety of commercial products, such as the PhotoVista product from Live Pictures, Inc.

As each left camera color image ($L_i$) is projected onto the cylindrical surface, an equivalent projection is applied to the corresponding depth map ($D_i$) to produce a cylindrical depth map ($D_i'$). The cylindrical depth maps ($D_i'$) are then merged to form a panoramic depth map ($D_{pan}$) with the same number of rows and columns found in the panoramic color image ($L_{pan}$). The depth value assigned to each pixel in the panoramic depth map is determined by the values found in one or more of the constituent projected depth maps ($D_i'$) in the same manner as the corresponding pixel in the panoramic color image is determined from one or more of the constituent projected color images ($L_i'$).

The resulting (left-eye) panoramic color image ($L_{pan}$) and panoramic depth map ($D_{pan}$) can then be used to produce a panoramic color image for the right eye ($R_{pan}$) using the pixel-shifting methods described above. It is to be appreciated that the calculation of $R_{pan}$ depends on the stereopsis factor "a." Conventional prior art means such as those presented in U.S. Pat. No. 5,396,583, the disclosure of which is incorporated by reference herein, may then be used to generate planar projection images of interactively selected portions of the panoramic scene based on panoramic color image ($L_{pan}$), while simultaneously using equivalent means to produce corresponding right-eye images based on panoramic color image $R_{pan}$.

Figure 8A:
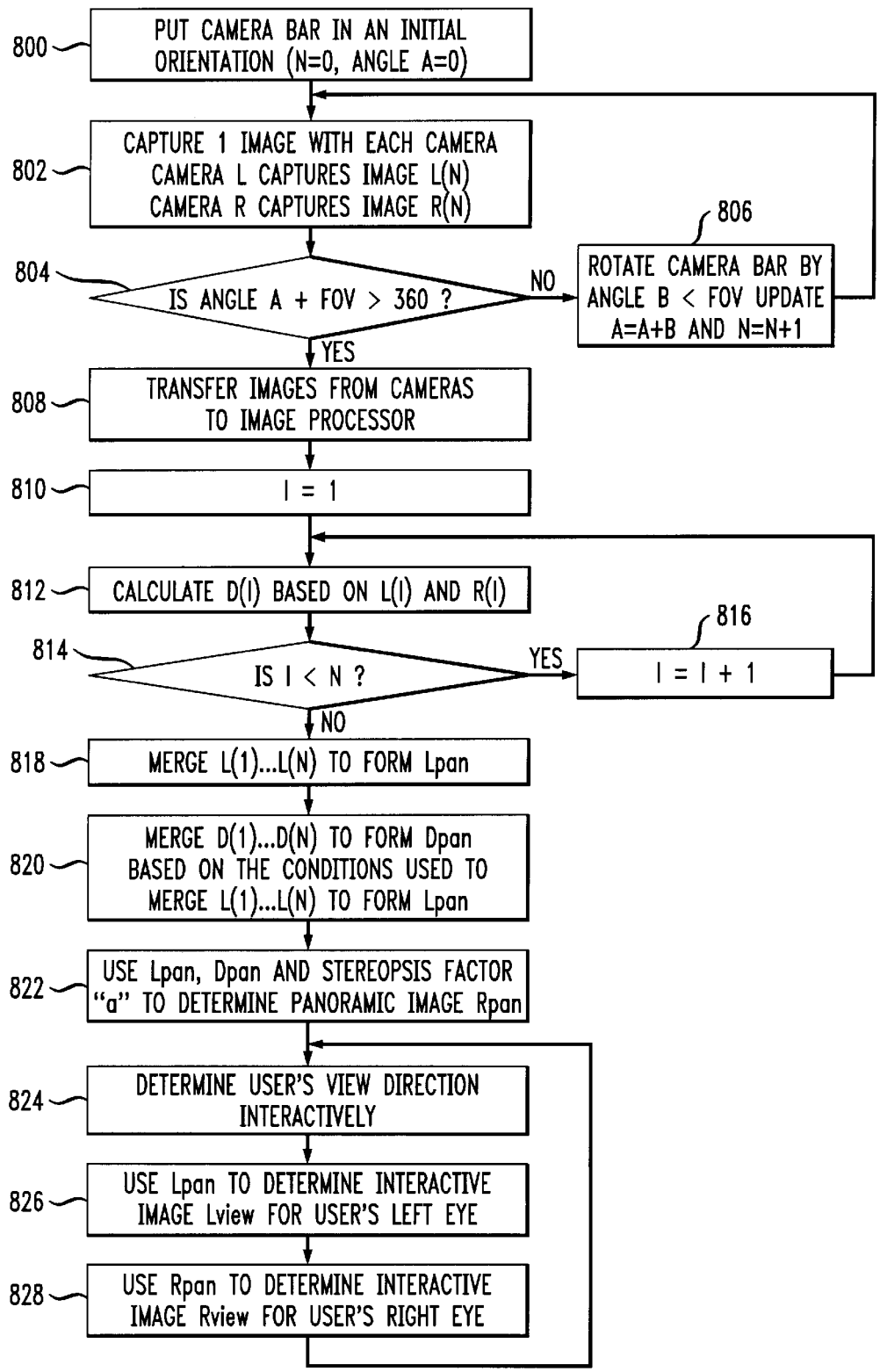
FIG. 8A is a flow diagram illustrating a method of generating a stereoscopic representation of a panoramic image according to a first embodiment of the present invention.

Referring now to FIG. 8A, a flow diagram illustrating the above process is shown. In step 800, the camera bar is put in an initial position. A counter N representing the image number to be captured is set to zero, and a cumulative rotation angle A is set to zero. In step 802, each camera captures one image. Camera L captures image L(N) and camera R captures image R(N). In step 804, angle A is added to the field of view (FOV) angle and checked to determine whether the resulting angle is greater than 360 degrees. If no, then the camera bar is rotated in step 806 by an angle B, where angle B is less than the FOV angle. The cumulative rotation angle is updated by adding B to the previous value of angle A (A=A+B). The counter N is also incremented by one (N=N+1). Then, step 802 is repeated again so that images are taken at the new angle. This iterative process is repeated until the angle A plus the FOV angle is greater than 360 degrees.

Then, in step 808, the images captured by the cameras are transferred to an image processor. It is to be appreciated that an exemplary image processing system including an image processor for performing image processing operations on the captured images according to the invention will be explained below in the context of FIG. 13.

Next, in step 810, a counter 1 representing the image number to be processed is set to zero. Then, in step 812, a depth map D(I) is calculated based on images L(I) and R(I). In step 814, a check is made to determine if I is less than N. If yes, then I is incremented by one (I=I+1) and step 812 is repeated, thus, calculating the depth map D(I+1) based on images L(I+1) and R(I+1). This iterative process is repeated until I is less than N. Then, in step 818, images L(1) through L(N) are merged to form $L_{pan}$. Next, in step 820, depth maps D(1) through D(N) are merged to form $D_{pan}$ based on the conditions used to merge L(1) through L(N) to form $L_{pan}$. In step 822, $L_{pan}$, $D_{pan}$ and the stereopsis factor "a" are used to determine the panoramic image $R_{pan}$. This may be done in a manner as described above.

It is to be understood that the process of FIG. 8A, as described so far, includes a first stage comprising steps 800 through 806 wherein the images are captured by the camera arrangement (e.g., camera arrangement shown in FIG. 6B), and a second stage comprising steps 810 through 822 wherein the data captured in the first stage is processed in order to form two panoramic images $L_{pan}$ and $R_{pan}$ for viewing by a user. FIG. 8A also illustrates a third stage, to be explained below in steps 824 through 828, which can be considered a stereoscopic image viewing stage wherein a user views the images generated in the second stage.

Thus, in step 824 of the third stage, the user's view direction is interactively determined. In step 826, $L_{pan}$ is used to determine the interactive image $L_{view}$ for the user's left eye. In step 828, $R_{pan}$ is used to determine the interactive image $R_{view}$ for the user's right eye. The interactive image $R_{view}$ and $L_{view}$ may be determined in accordance with the above-referenced U.S. Pat. No. 5,396,583.

Alternatively, the panoramic depth map ($D_{pan}$) and the stereopsis factor "a" can be used to produce a panoramic shift buffer ($S_{pan}$) using the pixel-shifting methods described above. Conventional prior art means such as those presented in the above-referenced U.S. Pat. No. 5,396,583 may then be used to generate interactive view-dependent left-eye planar images based on panoramic color image $L_{pan}$, while simultaneously using similar means to produce corresponding right-eye images based on panoramic color image $L_{pan}$ and the shift buffer $S_{pan}$.

The right-eye color image ($R_{pan}$) and shift buffer $S_{pan}$ depend on the proportionality factor "a" which controls the degree of stereopsis conveyed by the resulting left and right eye images. This value may be adjusted to provide the most comfortable and effective degree of stereopsis. Preferably, this value can be determined interactively by the user, subject to a brief delay as the image $R_{pan}$ or shift buffer $S_{pan}$ is recalculated.

Figure 8B:
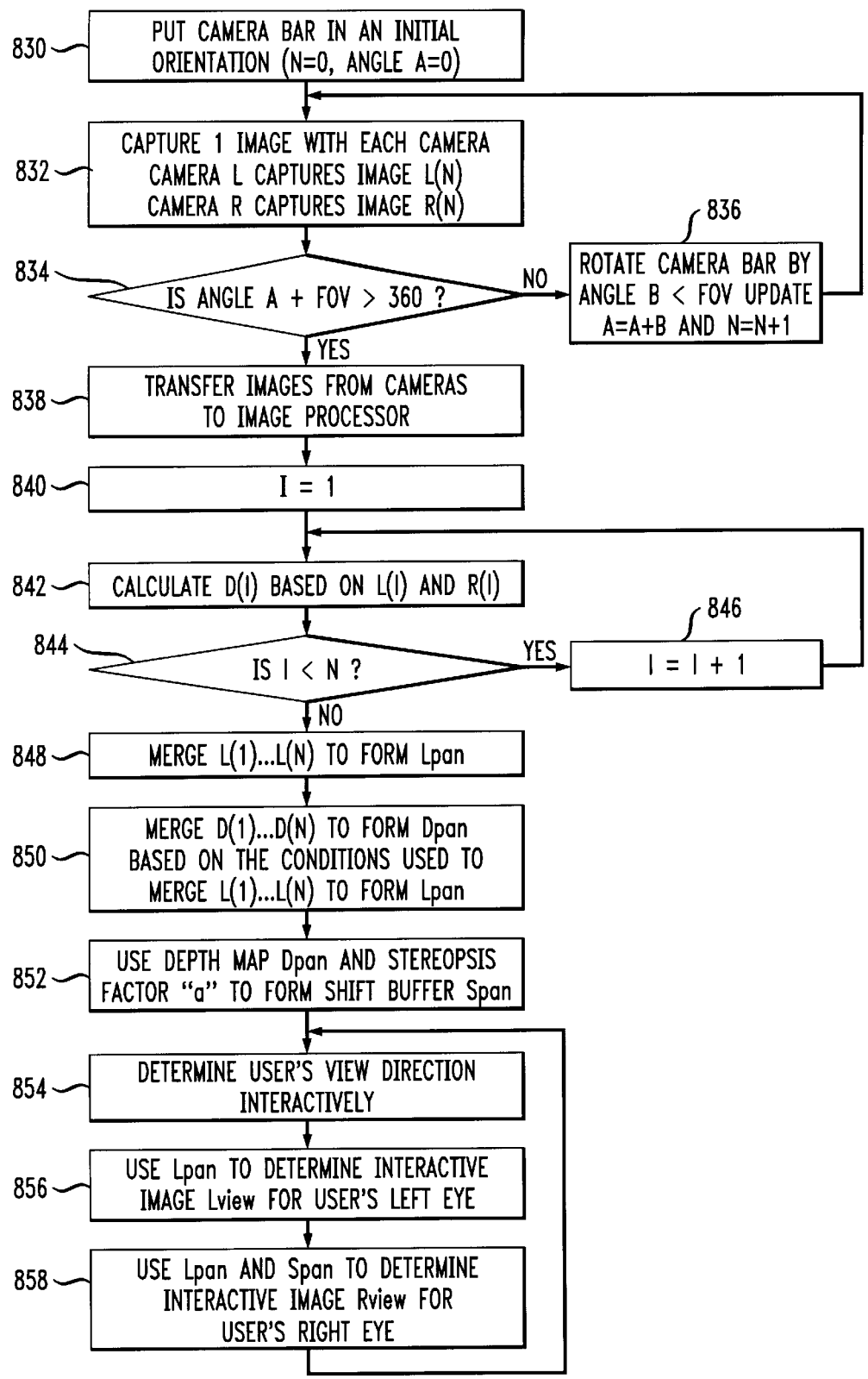
FIG. 8B is a flow diagram illustrating a method of generating a stereoscopic representation of a panoramic image according to a second embodiment of the present invention.

This alternative process is illustrated in FIG. 8B. It is to be appreciated that steps 830 through 850 are identical to steps 800 through 820 of FIG. 8A and, therefore, are not explained again. The difference between the two processes starts at step 852, wherein the depth map $D_{pan}$ and the stereopsis factor "a" are used to form a shift buffer $S_{pan}$, as explained above. Then, similar to steps 824 and 826 in FIG. 8A, the user's view direction is interactively determined and, in step 826, $L_{pan}$ is used to determine the interactive image $L_{view}$ for the user's left eye. Then, in step 858, rather than $R_{pan}$ being used to determine the interactive image $R_{view}$ for the user's right eye as in FIG. 8A, $L_{pan}$ and $S_{pan}$ are used to determine the interactive image $R_{view}$ for the user's right eye.

An alternative embodiment of this invention employs a single camera which captures an entire 360 degree panoramic image in a single shot. Two such alternative embodiments are shown in FIGS. 9A and 9B and in FIGS. 10A and 10B, respectively. This single camera approach may be accomplished with a rotating panoramic camera such as that described in U.S. Pat. No. 4,241,985, the disclosure of which is incorporated by reference herein. The rotating panoramic camera embodiment is shown in FIGS. 9A and 9B comprising a rotating panoramic camera 900 mounted on a tripod 902. The single camera approach can also be accomplished using a conventional camera in combination with a convex curved mirror and flat mirror such as that described in U.S. Design Pat. No. 312,263, the disclosure of which is incorporated by reference herein, or by the Portal 1 product offered by the Be Here Corp., 20195 Stevens Creek Blvd., Cupertino, Calif. 95014. This embodiment is shown in FIGS. 10A and 10B comprising a camera 1000 mounted on a tripod 1002, and a flat mirror 1004 and curved mirror 1006 mounted above the nodal point of the camera 1000. This device captures a complete 360 degree panoramic scene in a single annular image by capturing a single image of the panoramic scene reflected from the convex curved mirror onto the flat mirror. The flat mirror performs an "optic folding" function such that a more compact arrangement is possible and so as to facilitate connection of the camera and the convex curved mirror. The resulting annular image must be subsequently transformed into a cylindrical panoramic image using means well-known in the art. In either embodiment, the camera is initially used to capture a panoramic color image ($L_{pan}$) of a scene in the usual manner, with the camera positioned at some height H above the ground, as shown in FIG. 9A and FIG. 10A.

According to the invention, after capturing panoramic color image $L_{pan}$, the elevation of the camera above the ground is increased by a distance D of 6 to 12 inches, and a second panoramic color image ($V_{pan}$) of the scene is captured, as shown in FIG. 9B and FIG. 10B. The resulting pair of panoramic color images ($L_{pan}$ and $V_{pan}$) are then compared to determine a panoramic depth map ($D_{pan}$) for the scene. The second panoramic color image ($V_{pan}$) is then discarded, and the panoramic color image ($L_{pan}$) and panoramic depth map ($D_{pan}$) are used to generate planar projections of interactively selected portions of the panoramic scene in the same manner as described above.

Figure 11A:
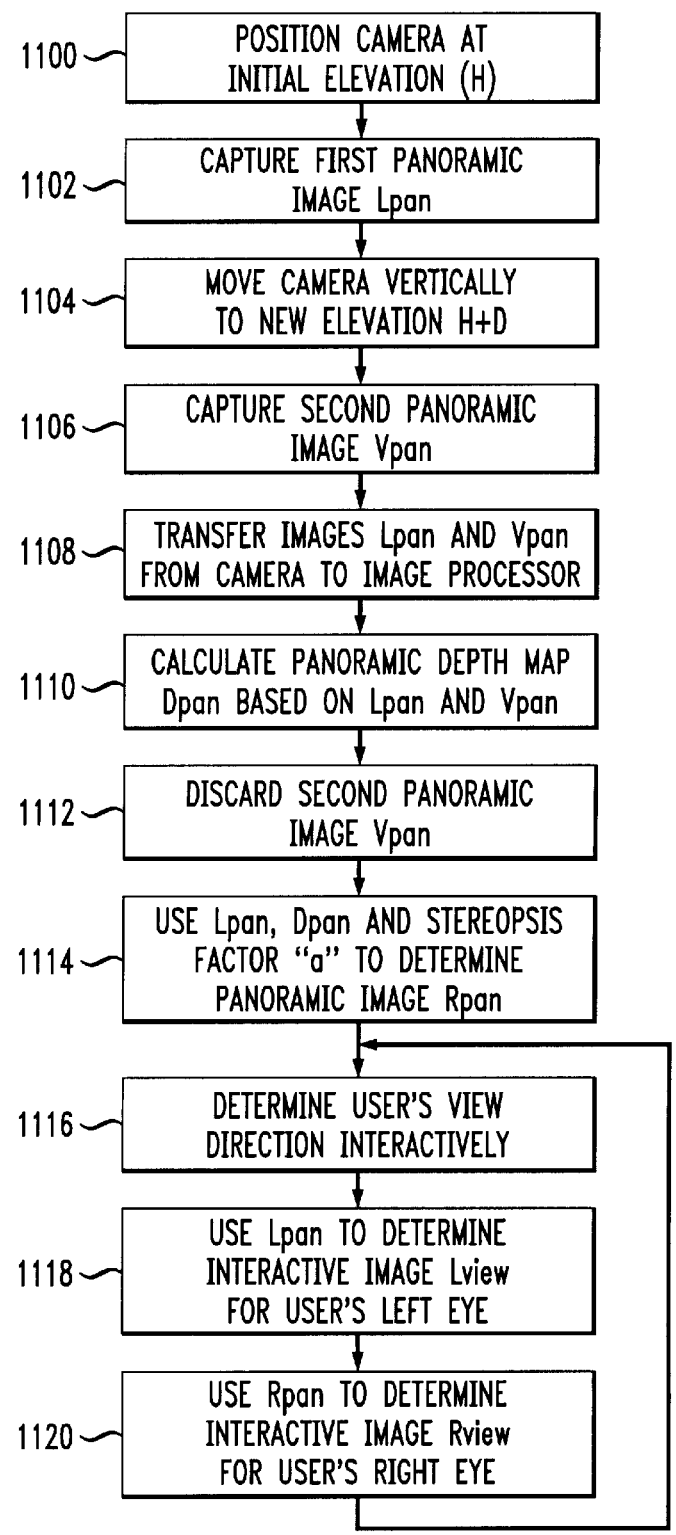
FIG. 11A is a flow diagram illustrating a method of generating a stereoscopic representation of a panoramic image according to a third embodiment of the present invention.
Figure 11B:
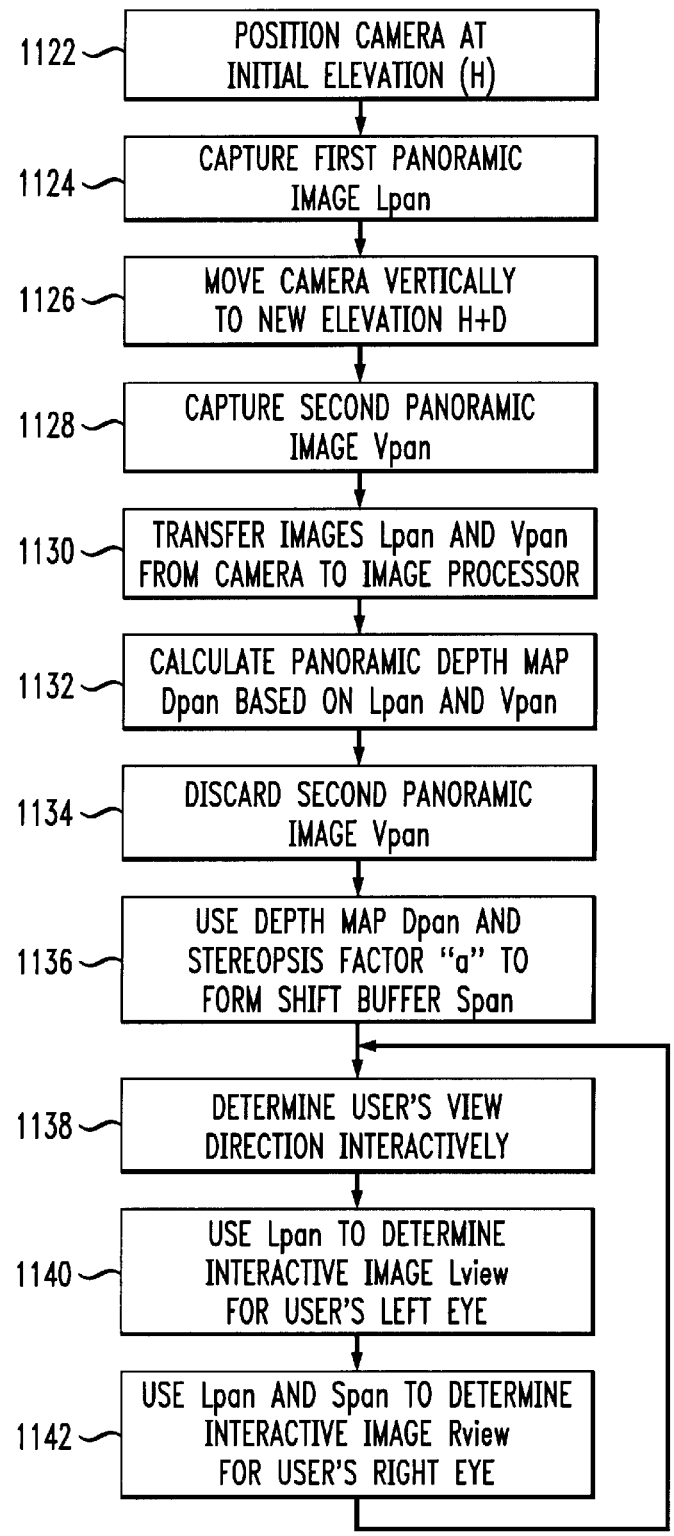
FIG. 11B is a flow diagram illustrating a method of generating a stereoscopic representation of a panoramic image according to a fourth embodiment of the present invention.

Referring now to FIGS. 11A and 11B, flow charts illustrating two methods for generating a stereoscopic representation of a panoramic image using the single rotating panoramic camera arrangement of FIGS. 9A and 9B are shown.

Figure 13:
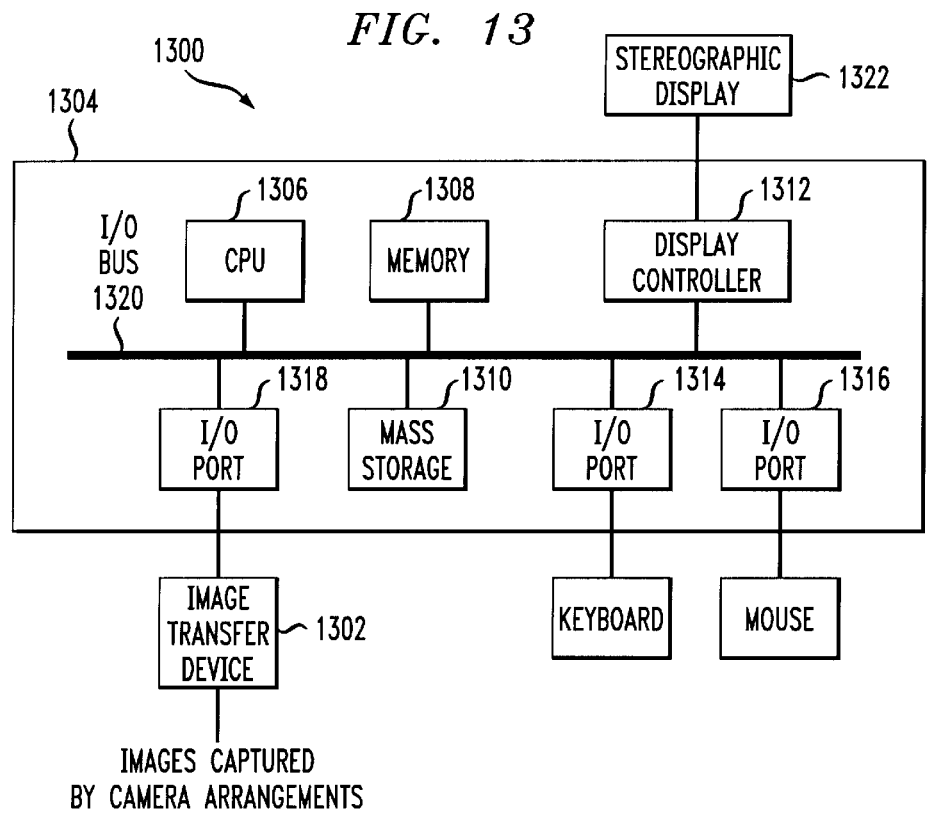
FIG. 13 is a block diagram illustrating an exemplary hardware implementation of image processing and display apparatus according to one embodiment of the present invention.

In the first method, the camera (e.g., camera 900) is positioned in an initial position (elevation H) in step 1100. In step 1102, a first panoramic image $L_{pan}$ is captured. In step 1104, the camera is moved vertically to a new elevation H+D. Then, a second panoramic image $V_{pan}$ is captured in step 1106. In step 1108, the images $L_{pan}$ and $V_{pan}$ are transferred from the camera to the image processor (FIG. 13). Next, in step 1110, the panoramic depth map $D_{pan}$ is calculated based on $L_{pan}$ and $V_{pan}$. The depth map may be calculated in a manner described above. In step 1112, the second panoramic image $V_{pan}$ is discarded. Next, steps 1114 through 1120 are performed to generate $R_{pan}$ and then the interactive views $L_{view}$ and $R_{view}$ in an identical manner as described above with respect to steps 822 through 828 of FIG. 8A.

An alternative method for generating a stereoscopic representation of a panoramic image using the configuration of FIGS. 9A and 9B is shown in FIG. 11B. Steps 1122 through 1134 of FIG. 11B are identical to steps 1100 through 1112 of FIG. 11A. However, rather than using $L_{pan}$, $D_{pan}$ and the stereopsis factor "a" to determine the panoramic image $R_{pan}$, the process in FIG. 11B uses $D_{pan}$ and the stereopsis factor "a" to form a shift buffer $S_{pan}$. Then, $L_{pan}$ is used to determine the interactive image $L_{view}$, while $L_{pan}$ and $S_{pan}$ are used to determine the interactive image $R_{view}$. These operations are shown in FIG. 11B as steps 1136 through 1142, which are identical to steps 852 through 858 of FIG. 8B.

Figure 12A:
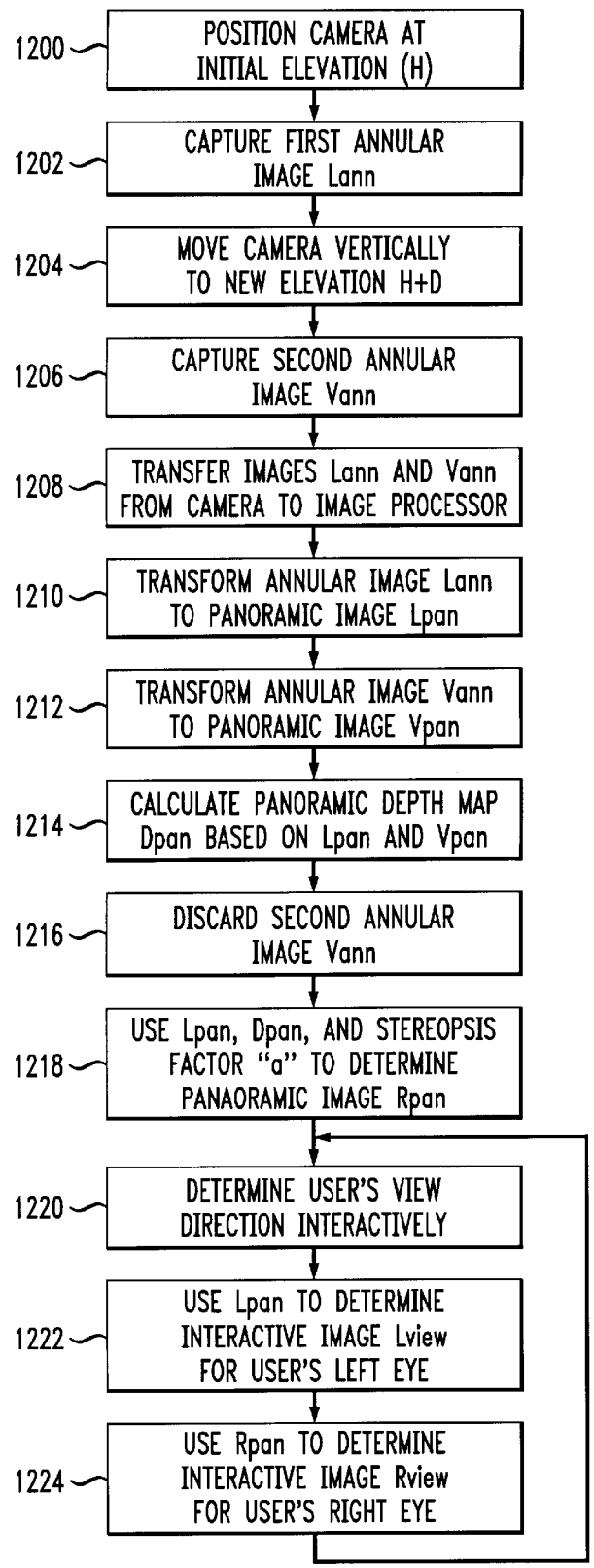
FIG. 12A is a flow diagram illustrating a method of generating a stereoscopic representation of a panoramic image according to a fifth embodiment of the present invention.
Figure 12B:
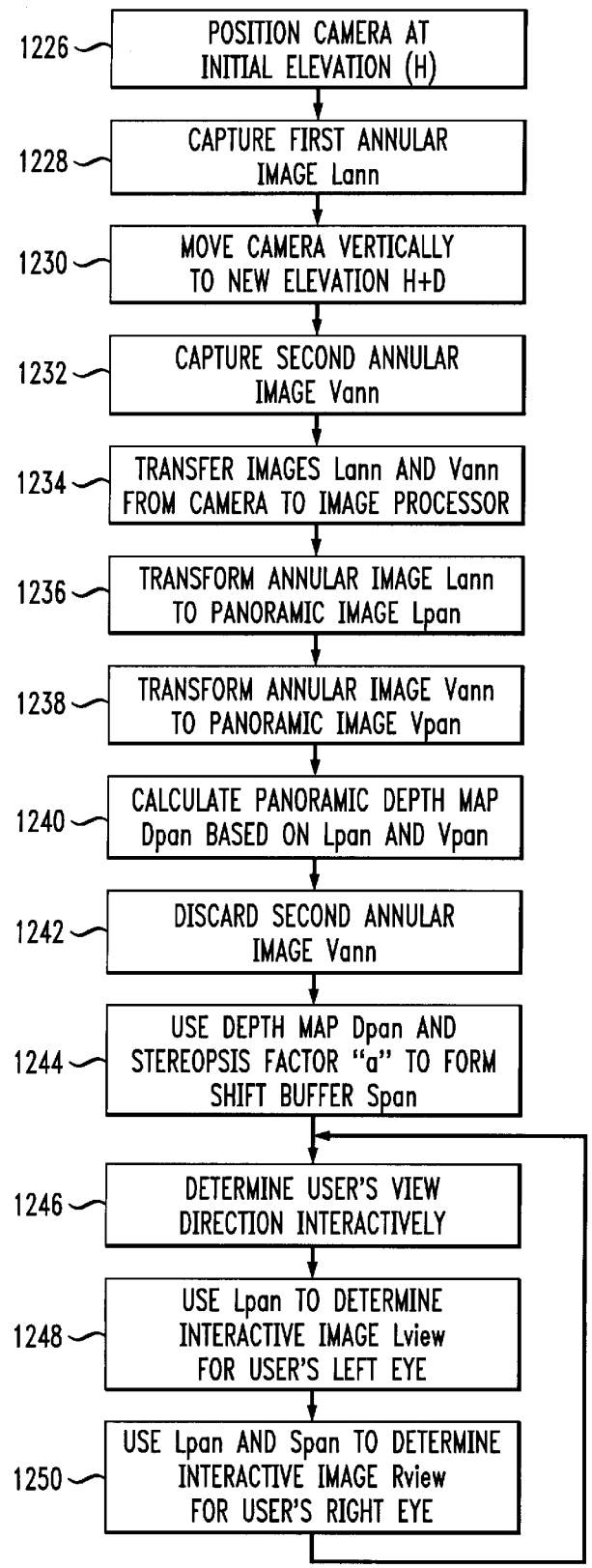
FIG. 12B is a flow diagram illustrating a method of generating a stereoscopic representation of a panoramic image according to a sixth embodiment of the present invention.

Referring now to FIGS. 12A and 12B, flow charts illustrating two methods for generating a stereoscopic representation of a panoramic image using the single camera and mirrors arrangement of FIGS. 10A and 10B are shown.

In the first method, the camera (e.g., camera 900) is positioned in an initial position (elevation H) in step 1200. In step 1202, a first annular image $L_{ann}$ is captured. In step 1204, the camera is moved vertically to a new elevation H+D. Then, a second annular image $V_{ann}$ is captured in step 1206. In step 1208, the images $L_{ann}$ and $V_{ann}$ are transferred from the camera to the image processor (FIG. 13). In step 1210, the annular image $L_{ann}$ is transformed to panoramic image $L_{pan}$. In step 1212, the annular image $V_{ann}$ is transformed to panoramic image $V_{pan}$. An illustrative method for performing this transformation will be described below. Next, in step 1214, the panoramic depth map $D_{pan}$ is calculated based on $L_{pan}$ and $V_{pan}$. The depth map may be calculated in a manner described above. In step 1216, the second annular image $V_{ann}$ is discarded. Next, steps 1218 through 1224 are performed to generate $R_{pan}$ and then the interactive views $L_{view}$ and $R_{view}$ in an identical manner as described above with respect to steps 1114 through 1120 of FIG. 11A.

Figure 14A:
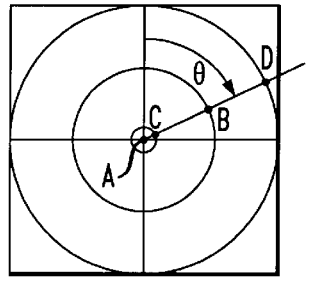
FIGS. 14A and 14B are diagrams illustrating transformation of an annular image to a panoramic image.
Figure 14B:
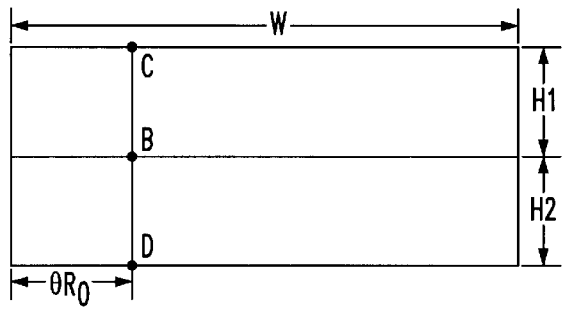

One method for transforming an annular image $V_{ann}$ to a panoramic image $V_{pan}$ is now explained in the context of FIGS. 14A and 14B. An annular image typically occupies a circular area within a square or rectangular image, as shown in FIG. 14A. This image (a grid of pixels) may be converted to a cylindrical panoramic image (another grid of pixels) using a method such as the following:

(1) First, identify the row $I_0$ and column $J_0$ for the point (A) corresponding to the center of the circular area occupied by the annular image. The distance between this point and any point on the perimeter of the circular area is the radius $R_{outer}$ (in pixels).

(2) Identify a circle which is centered on the point A and which corresponds to the points in the scene having a vertical elevation equal to that of the camera. The radius of this circle specifies the value of "$R_0$" in pixels. This circle corresponds to an elevations angle of $\phi=0$. This is called the "horizon circle."

(3) Select an inner circle also centered on the point (A). The radius of this circle is defined as $R_{inner}$ (in pixels).

(4) Establish a mapping function $\phi(R)$ which relates radius values R (in pixel units) to elevation angles $\phi$ in radians. A simple example of such a function is given by: $\phi(R)=(\pi/2)(R_0-R)/R_0$. This function assumes a simple linear relationship between the radius R and the elevation angle $\phi$. A more precise mapping function would depend on the shape of the mirror, the lens of the camera, and the distance from the camera to the mirror. Such functions are familiar to those skilled in the art.

(5) Based on the mapping function $\phi(R)$, determine the upper elevation angle $\phi_{upper}$ and the lower elevation angle $\phi_{lower}$. In the case of the simple mapping function shown above, these angles are determined as: $\phi_{upper}=(\pi/2)(R_0-R_{inner})/R_0$; and $\phi_{lower}=(\pi/2)(R_0-R_{outer})/R_0$.

(6) Create a new empty grid of pixels with a width W given by $W=2\pi R_0$, and a height given by $H=H_1+H_2$, where $H_1=R_0 \tan(\phi_{upper})$ and $H_2=R_0 \tan(\phi_{lower})$.

(7) Fill the newly created grid of pixels by treating each column as specified in the next steps. The resulting grid of pixels will constitute the cylindrical panoramic image.

(8) Let each column in the new grid of pixels may be identified by a column number I from 0 to W-1. For each column I, determine an angle $\theta$ given by: $\theta=2\pi I/W$, or, equivalently, $\theta=I/R_0$.

(9) Let each row in the new grid of pixels be identified by a row index J from 0 to H-1. For each row J, establish an elevation angle defined by: $\phi(J)=\arctan((H_1-J)/R_0)$. Then use the inverse of the mapping function $\phi(R)$ to determine the radius value associated with row J. In the case of the simple mapping function indicated above, this inverse mapping is given by: $R_J=R_0(1-\phi(J)/(\pi/2))$

(10) Determine the row index $I_{ann}$ and column index $J_{ann}$ of a pixel within the annular image given by: $I_{ann}=I_0+R_J \sin \theta$; and $J_{ann}=J_0+R_J \cos \theta$.

(11) Copy the color values from row $I_{ann}$ and column $J_{ann}$ of the annular image to row I of column J in the new grid of pixels.

Note that point "B" in this column (in FIG. 14B) corresponds to point "B" on the horizon circle in the annular image (FIG. 14A). Point "C" at the top of this column (in FIG. 14B) corresponds to point "C" on the inner circle in the annular image (FIG. 14A). Point "D" at the bottom of this column (in FIG. 14B) corresponds to point "D" on the outer circle in the annular image (FIG. 14A).

An alternative method for generating a stereoscopic representation of a panoramic image using the configuration of FIGS. 10A and 10B is shown in FIG. 12B. Steps 1226 through 1242 of FIG. 12B are identical to steps 1200 through 1216 of FIG. 12A. However, rather than using $L_{pan}$, $D_{pan}$ and the stereopsis factor "a" to determine the panoramic image $R_{pan}$, the process in FIG. 12B uses $D_{pan}$ and the stereopsis factor "a" to form a shift buffer $S_{pan}$. Then, $L_{pan}$ is used to determine the interactive image $L_{view}$, while $L_{pan}$ and $S_{pan}$ are used to determine the interactive image $R_{view}$. These operations are shown in FIG. 12B as steps 1244 through 1250, which are identical to steps 1136 through 1142 of FIG. 11B.

Many other embodiments should be obvious to one skilled in the art, including but not limited to arrangements in which a single rectilinear camera is used alternately in place of two rectilinear cameras, and arrangements which employ two rotating panoramic cameras or two cameras with curved mirrors separated by a suitable vertical displacement. Appropriate lenses may be used in place of the convex curved mirror.

Figure 15C:
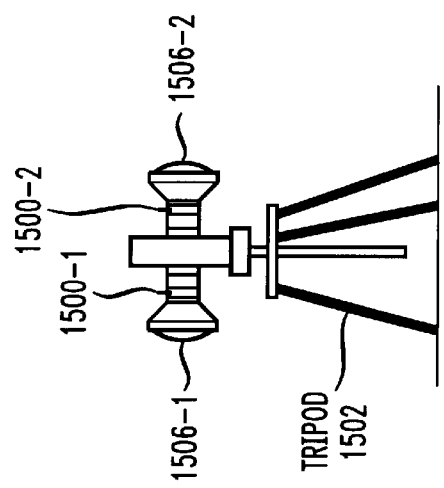
FIGS. 15A through 15C are elevation views of an image capturing arrangement according to a fourth embodiment of the present invention.
Figure 15B:
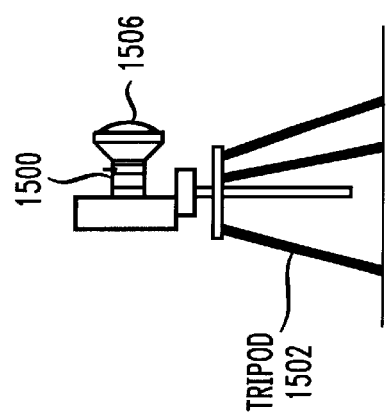
Figure 15A:
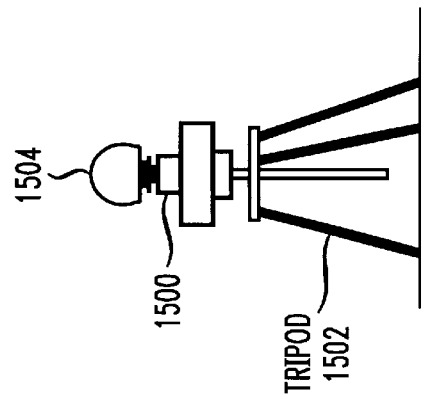

By way of one further alternative embodiment, FIGS. 15A through 15C illustrate camera arrangements that may be employed in accordance with the present invention which employ lenses with very large fields of view. Such lenses are commonly known as "fish-eye lenses." This special type of lens is used in place of a curved mirror. One example of such a lens is the "OmniLens" produced by Versacorp, 2454 E. Washington Blvd., Pasadena, Calif. 91104 (http://www.versacorp.com/). This type of lens 1504 can be used on a camera 1500 mounted on a tripod 1502 as shown in FIG. 15A to capture an entire scene in a single image. In this case, the camera is aimed in the vertical direction. The resulting image is similar to the annular image captured using a curved mirror, and this image may be converted to a cylindrical panorama using means similar to those used to convert an annular image to a cylindrical panorama.

In addition, there are a number of fish-eye lenses capable of capturing a 180 degree field of view. These include the 16 mm AF lens offered by Nikon Inc., 1300 Walt Whitman Rd., Melville, N.Y. 11747-3064. In this case, the camera may be mounted in a horizontal orientation, as shown in FIG. 15B. In this case, after capturing one image covering 180 degrees, the camera 1500 with lens 1506 may be rotated on its tripod 1502 by 180 degrees about the vertical axis. Then a second image may be captured covering the remainder of the scene.

Alternatively, two cameras 1500-1 and 1500-2 with 180 degree fish-eye lenses 1506-1 and 1506-2 may be mounted back-to-back on a tripod 1502 as shown in FIG. 15C. Such a configuration can be found in the Spherecam developed by Nearfield Simulations, Inc., 1330 E. 223rd St. Suite 524, Carson Calif., 90745 (http://www.nearfield.com/, then see "Technical Papers"). Similar equipment has been developed by Internet Pictures Corporation (iPIX), 1009 Commerce Park Drive, Oak Ridge, TM 37830.

Referring to FIG. 13, we now present an illustrative hardware embodiment of apparatus for implementing the present invention. It is to be appreciated that a system of the invention comprises two distinct components. The first component comprises cameras and camera mounting devices such as those shown in FIGS. 6A through 6C, 9A and 9B, and 10A and 10B. The second component comprises an image processing and display apparatus 1300 which is what is illustrated in FIG. 13. As will be explained below, in some embodiments, the images captured by the camera arrangements may be transferred to the image processing and display apparatus through the image transfer device 1302.

The image processing and display apparatus 1300 comprises a system unit 1304 and several externally attached peripheral components. The system unit 1304 includes a central processing unit 1306 such as an Intel Pentium (trademark) processor, a quantity of random access memory (RAM) 1308, a quantity of persistent mass storage 1310, a display controller 1312, and various input/output (i/o) controllers. The i/o controllers include a keyboard controller 1314 and mouse controller 1316 which allow a user to control the operation of the unit. These i/o controllers also include one or more serial, parallel, universal serial bus (USB), or other type of controller 1318 needed to communicate with an image transfer device 1302. The components of unit 1304 are operatively coupled via an i/o bus 1320.

The quantity of random access memory may be in the range of 10 to 100 megabytes, although it is possible to have greater or lesser quantities of such memory. Data stored in this memory may be ephemeral and needs to persist only as long as the device is in operation. Suitable memory devices are available from many sources.

The quantity of mass storage may be in the range of 1 to 10 gigabytes although greater or lesser amounts are possible. This storage capacity may be implemented in the form of magnetic disks which are capable of retaining the stored data even when the device is not in operation. Suitable storage devices are available from many sources.

The image transfer device 1302, used to transfer the images captured by the camera arrangements to the image processing and display apparatus, may be an image scanner which can be used to digitize conventional photographic prints derived from cameras using photographic film. A wide variety of products providing this functionality are available. These products typically communicate with the system unit by means of a parallel port i/o controller or by means of a USB port.

The image transfer device 1302 may alternatively be a digital camera which communicates with the system unit by one of a variety of means. For example, the digital camera may be directly connected to the system unit by means of a serial port, a parallel port or a USB port. Alternatively, communication between a digital camera and the system unit may also be accomplished by means of a removal memory medium such as a floppy disk, Compact Flash memory card, or other media. If the removable memory medium is a floppy disk, then the images captured by the digital camera can be communicated to the system unit by means of a floppy disk drive and floppy disk i/o controller. If the removable memory medium consists of a Compact Flash card, then the images captured by the digital camera can be communicated to the system unit by means of a Compact Flash reader which may communicate with the system unit by means of a parallel port or USB port. It is to be appreciated that the digital camera may also serve as the type of camera used in the arrangements shown in FIG. 6B, FIGS. 9A and 9B, and FIGS. 10A and 10B.

The display controller 1304 includes circuits capable of presenting a left eye image and a right eye image on an external stereographic display 1322. Such a pair of images is called a stereographic image pair. The ability to present a stereographic image pair on an external stereographic display may be provided by any one of many commercial graphic display adapters including, for example, the Millennium II AGP graphics adapter (made by Matrox) or the Intense 3D Pro 3400 PCI graphics adapter (made by Integraph). This device does not necessarily possess any particular stereographic capabilities other than the ability to present at least two images on the external stereographic display. For example, these images may simply be presented in two different windows on a single cathode ray tube (CRT) or liquid crystal display (LCD).

The stereographic display 1322 comprises any device capable of displaying a stereographic image pair such that the left eye image is visible to a viewer's left eye and the right eye image is visible to the viewer's right eye. There are a number of means commonly used to accomplish this function. In the simplest case, the two images are simply displayed side-by-side and the viewer must cross his or her eyes to view the appropriate images in each eye. This simple form of stereographic display can be accomplished with any common computer graphics display.

Another means of presenting stereographic image pairs alternately displays both images of a given pair in the same area of the stereographic display and the viewer must wear special shutter glasses which alternately block the viewer's left eye or right eye. The shutter glasses are synchronized with the alternating display of the left eye image and right eye image so the viewer's left eye is blocked when the image for the right eye is being displayed, and the viewer's right eye is blocked when the image for the left eye is being displayed. A large number of products have been developed based on this technique, including the Crystal Eyes products offered by the StereoGraphics Corporation (2171 E. Francisco Blvd., San Rafael, Calif. 94901, http://www.StereoGraphics.com).

In another means of presenting stereographic image pairs, the stereographic display comprises two separate displays, one for a viewer's left eye and one for the viewer's right eye. Additional means may be familiar to one skilled in the art, and further means may be developed in the future. The present invention does not depend on the particular means used to present stereoscopic image pairs. Rather, the present invention provides a means of generating stereoscopic image pairs. As described in above, there are a number of means for presenting stereoscopic image pairs to a viewer, and the present invention can be used with any of these means, as well as other suitable means.

As previously mentioned, the methodologies of the present invention may be considered as comprising three stages: (i) a first stage comprising image capture; (ii) a second stage comprising image processing; and (iii) a third stage comprising image display. The first stage is accomplished using the camera arrangements of FIGS. 6A through 6C, 9A and 9B, and 10A and 10B. The second and third stages can both be performed using the image processing and display apparatus 1300 shown in FIG. 13. Alternatively, the second and third stages may also be performed on separate systems. The block diagram of FIG. 13 for the image processing and display apparatus shows a single system capable of performing all steps, but this invention does not require both of the second and third stages to be performed on one system. In one preferred form, the second stage is performed on one system, by a panorama author, and the third stage is performed on another system, or on many other systems controlled by panorama clients who merely view the results generated by the panorama author. In this case, the system used for the third stage does not require the image transfer device 1302 which is provided for the transfer of original images from the cameras to the image processing apparatus at the start of the second stage.

Further, it is to be appreciated that while the apparatus of FIG. 13 depicts a processor as a a single CPU, e.g., an Intel Pentium, the term "processor" as used herein is intended to include any one or more suitable processing devices. Accordingly, software components including instructions or code for performing the methodologies of the invention, as described herein, may be stored in one or more of the associated memory devices and, when ready to be utilized, loaded in part or in whole and executed by the one or more processing devices.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of providing a stereoscopic representation of a panoramic scene, the method comprising the steps of:
   obtaining at least one image representative of the panoramic scene;
   obtaining a depth map associated with the image representative of the panoramic scene, the depth map including image data and corresponding depth values associated with a nodal point of a camera used to capture the image representative of the panoramic scene; and
   generating at least one member of a stereoscopic pair of images from the image representative of the panoramic scene and the depth map associated with the image, the member being appropriate for viewing by one of a left eye and a right eye of a viewer.

2. The method of claim 1, wherein the generating operation comprises generating both members of a stereoscopic pair of images from the image representative of the panoramic scene and a depth map associated with the image, one member of the stereoscopic pair being appropriate for viewing by a left eye of a viewer and the other member of the pair being appropriate for viewing by a right eye of the viewer.

3. The method of claim 1, wherein the generating operation comprises shifting at least a portion of pixel color values associated with the image representative of the panoramic scene by a horizontal displacement proportional to the corresponding depth map values to generate at least a portion of pixel color values for the at least one stereoscopic image.

4. The method of claim 3, wherein the horizontal displacement proportional to the corresponding depth map values is a function of a factor selected to control stereopsis.

5. The method of claim 1, wherein the generating operation comprises smearing at least a portion of pixel color values associated with the image representative of the panoramic scene up to a horizontal displacement proportional to the corresponding depth map values to generate at least a portion of pixel color values for the at least one member of the stereoscopic pair of images.

6. The method of claim 5, wherein the horizontal displacement proportional to the corresponding depth map values is a function of a factor selected to control stereopsis.

7. The method of claim 1, wherein the generating operation comprises maintaining a shift buffer which stores, for pixel color values associated with the image representative of the panoramic scene, a horizontal displacement proportional to the corresponding depth map values to be used to generate pixel color values for the at least one member of the stereoscopic pair of images.

8. The method of claim 7, wherein the generating operation comprises generating pixel color values for the at least one member of the stereoscopic pair of images from the shift buffer.

9. The method of claim 1, wherein the generating operation comprises constructing the at least one member of the stereoscopic pair of images by horizontally shifting pixels from the image representative of the panoramic scene by distances determined by contents of the depth map.

10. The method of claim 9, wherein the pixels in each row i of the image being generated are determined by copying the pixel at each column j in row i of the image representative of the panoramic scene to a column k which is displaced from column j by a distance proportional to a value found at row i and column j of the depth map.

11. The method of claim 10, wherein the pixel found at column j of row i of the image representative of the panoramic scene is also copied to each intermediate column between columns j and k in row i of the image being generated.

12. The method of claim 10, wherein the pixel found at column j+1 or column j+1 in row i of the image representative of the panoramic scene is copied to each intermediate column between columns j and k in row i of the image being generated.

13. The method of claim 1, wherein the depth map obtaining operation comprises comparing two images representative of the panoramic scene.

14. The method of claim 1, wherein the depth map obtaining operation comprises generating the depth map as a by-product of a three dimensional rendering process, when the image representative of the panoramic scene is based on a computer generated image of three dimensional digital models.

15. The method of claim 1, wherein the depth map obtaining operation comprises generating the depth map directly from a range-finding camera, when the image representative of the panoramic scene is captured by the range-finding camera.

16. The method of claim 1, wherein the panoramic scene image obtaining operation comprises capturing the image using an arrangement comprising two rectilinear cameras separated by one of a fixed and variable horizontal distance and mounted on a platform which can be rotated about a vertical axis.

17. The method of claim 16, wherein the rectilinear cameras record images on photographic film.

18. The method of claim 16, wherein the rectilinear cameras are digital cameras.

19. The method of claim 16, wherein a nodal point of a lens of one of the rectilinear cameras is located on the vertical axis.

20. The method of claim 16, wherein multiple pairs of rectilinear images are captured by rotating the platform through a sequence of rotational angles, the rotational angles allowing a degree of overlap between successive images captured with the rectilinear camera having its nodal point located on the axis of rotation, where each pair of rectilinear images is captured with the platform positioned at one of the rotational angles, with one of the pair of rectilinear images being captured by one of the cameras and another of the pair of rectilinear images being captured by another of the cameras.

21. The method of claim 20, wherein the rectilinear images captured by the camera having its nodal point located on the axis of rotation are projected onto a cylindrical surface and combined to form a panoramic color image.

22. The method of claim 21, wherein each pair of rectilinear images determined by a particular rotational angle of said platform is used to determine a corresponding rectilinear depth map.

23. The method of claim 22, wherein contents of each rectilinear depth map comprise values proportional to the reciprocal of a distance from the nodal point of the camera to a nearest point in the scene in a direction represented by a corresponding pixel in the panoramic color image.

24. The method of claim 23, wherein the set of rectilinear depth maps are combined to form a panoramic depth map having elements in one-to-one correspondence with the panoramic color image.

25. The method of claim 1, wherein the panoramic scene image obtaining operation comprises capturing the image using an arrangement comprising a panoramic camera mounted on a vertically adjustable platform.

26. The method of claim 25, wherein the panoramic camera is a rotating panoramic camera which rotates about a vertical axis to capture an entire scene in a single cylindrical panoramic image.

27. The method of claim 25, wherein the panoramic camera employs a convex curved mirror to capture an entire panoramic scene in a single annular image.

28. The method of claim 25, wherein the panoramic camera employs a fisheye lens to capture an entire panoramic scene in a single circular image.

29. The method of claim 25, wherein the panoramic camera records the image on photographic film.

30. The method of claim 25, wherein the panoramic camera is a digital camera.

31. The method of claim 25, wherein there is a one-to-one correspondence between elements of the panoramic depth map and pixels comprising the panoramic color image.

32. The method of claim 31, wherein the contents of the panoramic depth map comprise values proportional the reciprocal of a distance from a nodal point of the camera to a nearest point in the scene in a direction represented by a corresponding pixel in the panoramic color image.

33. The method of claim 25, wherein two panoramic color images are captured, where one of the panoramic color images is captured with the panoramic camera located at a first elevation, and the second panoramic color image is captured with the panoramic camera located at a second elevation vertically displaced from the location of the panoramic camera used to capture the first panoramic color image.

34. The method of claim 33, wherein the panoramic depth map is determined by comparison of the two panoramic color images captured by the panoramic camera.

35. Apparatus for providing a stereoscopic representation of a panoramic scene, the apparatus comprising:
   an image capturing arrangement to obtain at least one image representative of the panoramic scene;
   at least one processor operative to: (i) receive the at least one image representative of the panoramic scene; (ii) obtain a depth map associated with the image representative of the panoramic scene, the depth map including image data and corresponding depth values associated with a nodal point of a camera used to capture the image representative of the panoramic scene; and (ii) generate at least one member of a stereoscopic pair of images from the image representative of the panoramic scene and the depth map associated with the image, the member being appropriate for viewing by one of a left eye and a right eye of a viewer.

36. The apparatus of claim 35, wherein the generating operation comprises generating both members of a stereoscopic pair of images from the image representative of the panoramic scene and a depth map associated with the image, one member of the stereoscopic pair being appropriate for viewing by a left eye of a viewer and the other member of the pair being appropriate for viewing by a right eye of the viewer.

37. The apparatus of claim 35, wherein the generating operation comprises shifting at least a portion of pixel color values associated with the image representative of the panoramic scene by a horizontal displacement proportional to the corresponding depth map values to generate at least a portion of pixel color values for the at least one stereoscopic image.

38. The apparatus of claim 37, wherein the horizontal displacement proportional to the corresponding depth map values is a function of a factor selected to control stereopsis.

39. The apparatus of claim 35, wherein the generating operation comprises smearing at least a portion of pixel color values associated with the image representative of the panoramic scene up to a horizontal displacement proportional to the corresponding depth map values to generate at least a portion of pixel color values for the at least one member of the stereoscopic pair of images.

40. The apparatus of claim 39, wherein the horizontal displacement proportional to the corresponding depth map values is a function of a factor selected to control stereopsis.

41. The apparatus of claim 35, wherein the generating operation comprises maintaining a shift buffer which stores, for pixel color values associated with the image representative of the panoramic scene, a horizontal displacement proportional to the corresponding depth map values to be used to generate pixel color values for the at least one member of the stereoscopic pair of images.

42. The apparatus of claim 41, wherein the generating operation comprises generating pixel color values for the at least one member of the stereoscopic pair of images from the shift buffer.

43. The apparatus of claim 35, wherein the generating operation comprises constructing the at least one member of the stereoscopic pair of images by horizontally shifting pixels from the image representative of the panoramic scene by distances determined by contents of the depth map.

44. The apparatus of claim 35, wherein the image capturing arrangement comprises two rectilinear cameras separated by one of a fixed and variable horizontal distance and mounted on a platform which can be rotated about a vertical axis.

45. The apparatus of claim 44, wherein the rectilinear cameras record images on photographic film.

46. The apparatus of claim 44, wherein the rectilinear cameras are digital cameras.

47. The apparatus of claim 44, wherein a nodal point of a lens of one of the rectilinear cameras is located on the vertical axis.

48. The apparatus of claim 44, wherein multiple pairs of rectilinear images are captured by rotating the platform through a sequence of rotational angles, the rotational angles allowing a degree of overlap between successive images captured with the rectilinear camera having its nodal point located on the axis of rotation, where each pair of rectilinear images is captured with the platform positioned at one of the rotational angles, with one of the pair of rectilinear images being captured by one of the cameras and another of the pair of rectilinear images being captured by another of the cameras.

49. The apparatus of claim 48, wherein the rectilinear images captured by the camera having its nodal point located on the axis of rotation are projected onto a cylindrical surface and combined to form a panoramic color image.

50. The apparatus of claim 49, wherein each pair of rectilinear images determined by a particular rotational angle of said platform is used to determine a corresponding rectilinear depth map.

51. The apparatus of claim 50, wherein contents of each rectilinear depth map comprise values proportional to the reciprocal of a distance from the nodal point of the camera to a nearest point in the scene in a direction represented by a corresponding pixel in the panoramic color image.

52. The apparatus of claim 51, wherein the set of rectilinear depth maps are combined to form a panoramic depth map having elements in one-to-one correspondence with the panoramic color image.

53. The apparatus of claim 35, wherein the image capturing arrangement comprises a panoramic camera mounted on a vertically adjustable platform.

54. The apparatus of claim 53, wherein the panoramic camera is a rotating panoramic camera which rotates about a vertical axis to capture an entire scene in a single cylindrical panoramic image.

55. The apparatus of claim 53, wherein the panoramic camera employs a convex curved mirror to capture an entire panoramic scene in a single annular image.

56. The apparatus of claim 53, wherein the panoramic camera employs a fisheye lens to capture an entire panoramic scene in a single circular image.

57. The apparatus of claim 53, wherein the panoramic camera records the image on photographic film.

58. The apparatus of claim 53, wherein the panoramic camera is a digital camera.

59. The apparatus of claim 53, wherein there is a one-to-one correspondence between elements of the panoramic depth map and pixels comprising the panoramic color image.

60. The apparatus of claim 59, wherein the contents of the panoramic depth map comprise values proportional the reciprocal of a distance from a nodal point of the camera to a nearest point in the scene in a direction represented by a corresponding pixel in the panoramic color image.

61. The apparatus of claim 53, wherein two panoramic color images are captured, where one of the panoramic color images is captured with the panoramic camera located at a first elevation, and the second panoramic color image is captured with the panoramic camera located at a second elevation vertically displaced from the location of the panoramic camera used to capture the first panoramic color image.

62. The apparatus of claim 61, wherein the panoramic depth map is determined by comparison of the two panoramic color images captured by the panoramic camera.

63. Apparatus for providing a stereoscopic representation of a panoramic scene, the apparatus comprising:

at least one processor operative to: (i) receive the at least one image representative of the panoramic scene captured by an image capturing arrangement; (ii) obtain a depth map associated with the image representative of the panoramic scene, the depth map including image data and corresponding depth values associated with a nodal point of a camera used to capture the image representative of the panoramic scene; and (ii) generate at least one member of a stereoscopic pair of images from the image representative of the panoramic scene and the depth map associated with the image, the member being appropriate for viewing by one of a left eye and a right eye of a viewer.

* * * * *

UNITED STATES PATENT AND TRADEMARK OFFICE
CERTIFICATE OF CORRECTION

PATENT NO.     : 6,791,598 B1
DATED          : September 14, 2004
INVENTOR(S)    : W. L. Luken et al.

It is certified that error appears in the above-identified patent and that said Letters Patent is hereby corrected as shown below:

Title page, Item [54] and Column 1, line 3,
Title, replace "STEROSCOPIC" with -- STEREOSCOPIC --

Column 22,
Line 49, replace "column j+l or column j+1" with -- column j+1 or column j-1 --

Signed and Sealed this

Twenty-sixth Day of October, 2004

JON W. DUDAS
*Director of the United States Patent and Trademark Office*